(12) United States Patent
Higginson et al.

(10) Patent No.: US 12,423,162 B2
(45) Date of Patent: Sep. 23, 2025

(54) ANOMALY DETECTION USING FORECASTING COMPUTATIONAL WORKLOADS

(71) Applicant: Oracle International Corporation, Redwood Shores, CA (US)

(72) Inventors: Antony Stephen Higginson, Cheshire (GB); Octavian Arsene, Bucharest (RO); Mihaela Dediu, Manchester (GB); Thomas Elders, Dublin (GB)

(73) Assignee: Oracle International Corporation, Redwood Shores, CA (US)

( * ) Notice: Subject to any disclaimer, the term of this patent is extended or adjusted under 35 U.S.C. 154(b) by 293 days.

(21) Appl. No.: 18/116,942

(22) Filed: Mar. 3, 2023

(65) Prior Publication Data

US 2023/0205664 A1 Jun. 29, 2023

Related U.S. Application Data

(63) Continuation-in-part of application No. 18/152,481, filed on Jan. 10, 2023, which is a continuation-in-part
(Continued)

(51) Int. Cl.
*G06F 9/50* (2006.01)
*G06F 11/34* (2006.01)
*G06N 20/20* (2019.01)

(52) U.S. Cl.
CPC ............ *G06F 9/5083* (2013.01); *G06F 9/505* (2013.01); *G06F 9/5088* (2013.01);
(Continued)

(58) Field of Classification Search
None
See application file for complete search history.

(56) References Cited

U.S. PATENT DOCUMENTS

| 7,716,022 B1 | 5/2010 | Park et al. |
| 10,372,572 B1 | 8/2019 | Kesarwani et al. |

(Continued)

FOREIGN PATENT DOCUMENTS

WO 2014/055028 A1 4/2014

OTHER PUBLICATIONS

Hermine N. Akouemo et al., "Time series outlier detection and imputation", May 2022 (Year: 2022).

*Primary Examiner* — Qing Yuan Wu
(74) *Attorney, Agent, or Firm* — Invoke

(57) ABSTRACT

Techniques for predicting anomalies in forecasted time-series data are disclosed. A system. A system predicts whether a monitored computing system will experience anomalies by comparing forecasted values associated with components in the monitored computing system to threshold values. The system utilizes time-series machine learning models to forecast workloads of computing resources in the monitored computing system. The system trains and tests multiple different versions of a time-series model and selects the most accurate version to generate forecasts for a particular workload in the computing system. The system compares the forecasts to threshold values to predict anomalies. Based on detecting anomalies, the system generates recommendations for remediating predicted anomalies.

18 Claims, 14 Drawing Sheets

Related U.S. Application Data of application No. 16/917,821, filed on Jun. 30, 2020, now Pat. No. 11,586,706.

(60) Provisional application No. 62/939,603, filed on Nov. 23, 2019, provisional application No. 62/901,088, filed on Sep. 16, 2019.

(52) U.S. Cl.
CPC ...... *G06F 11/3409* (2013.01); *G06F 11/3433* (2013.01); *G06F 11/3442* (2013.01); *G06F 2209/5019* (2013.01); *G06N 20/20* (2019.01)

(56) References Cited

U.S. PATENT DOCUMENTS

| | | |
|---|---|---|
| 2010/0027432 A1 | 2/2010 | Gopalan et al. |
| 2011/0302112 A1 | 12/2011 | Shan |
| 2014/0310059 A1 | 10/2014 | Ellis et al. |
| 2015/0289149 A1 | 10/2015 | Becht et al. |
| 2017/0249562 A1 | 8/2017 | Garvey et al. |
| 2018/0039555 A1 | 2/2018 | Salunke et al. |
| 2018/0300737 A1 | 10/2018 | Bledsoe et al. |
| 2019/0236497 A1 | 8/2019 | Santos et al. |
| 2019/0325328 A1 | 10/2019 | Katz et al. |
| 2020/0082316 A1 | 3/2020 | Megahed et al. |
| 2020/0285503 A1* | 9/2020 | Dou ..................... G06F 9/5072 |
| 2021/0081492 A1 | 3/2021 | Higginson et al. |

* cited by examiner

ANOMALY DETECTION USING FORECASTING COMPUTATIONAL WORKLOADS

INCORPORATION BY REFERENCE; DISCLAIMER

Each of the following applications are hereby incorporated by reference: application Ser. No. 18/169,661, filed Feb. 15, 2023; application Ser. No. 18/152,481, filed Jan. 10, 2023; application Ser. No. 16/917,821, filed Jun. 30, 2020; application 62/901,088, filed Sep. 16, 2019; application 62/939,603, filed Nov. 23, 2019. The applicant hereby rescinds any disclaimer of claims scope in the parent application(s) or the prosecution history thereof and advise the USPTO that the claims in the application may be broader that any claim in the parent application(s).

The subject matter of this application is related to the subject matter in U.S. Pat. No. 10,331,802, entitled "System for Detecting and Characterizing Seasons," having Ser. No. 15/057,065, filing date Feb. 29, 2016, which is hereby incorporated by reference.

The subject matter of this application is related to the subject matter in U.S. Pat. No. 10,699,211, entitled "Supervised Method for Classifying Seasonal Patterns in Time Series Data," having Ser. No. 15/057,060 and filing date Feb. 29, 2016, which is hereby incorporated by reference.

The subject matter of this application is related to the subject matter in U.S. Pat. No. 10,885,461, entitled "Unsupervised Method for Classifying Seasonal Patterns in Time Series Data," having Ser. No. 15/057,062 and filing date Feb. 29, 2016, which is hereby incorporated by reference.

TECHNICAL FIELD

The present disclosure relates to analyzing time-series data. In particular, the present disclosure relates to techniques for detecting anomalies in forecasted time-series predictions for a monitored computing system.

BACKGROUND

Applications and data are increasingly migrating from on-premises systems to cloud-based software-as-a-service (SaaS) systems. Within such cloud-based systems, computational resources such as processor, memory, storage, network, and/or disk input/output (I/O) may be consumed by entities and/or components such as physical machines, virtual machines, applications, application servers, databases, database servers, services, and/or transactions.

Cloud service providers typically ensure that the cloud-based systems have enough resources to satisfy customer demand and requirements. For example, the cloud service providers may perform capacity planning that involves estimating resources required to run the customers' applications, databases, services, and/or servers. The cloud service providers may also monitor the execution of the customers' systems for performance degradation, errors, and/or other issues. However, because such monitoring techniques are reactive, errors, failures, and/or outages on the systems can occur before remedial action is taken to correct or mitigate the issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
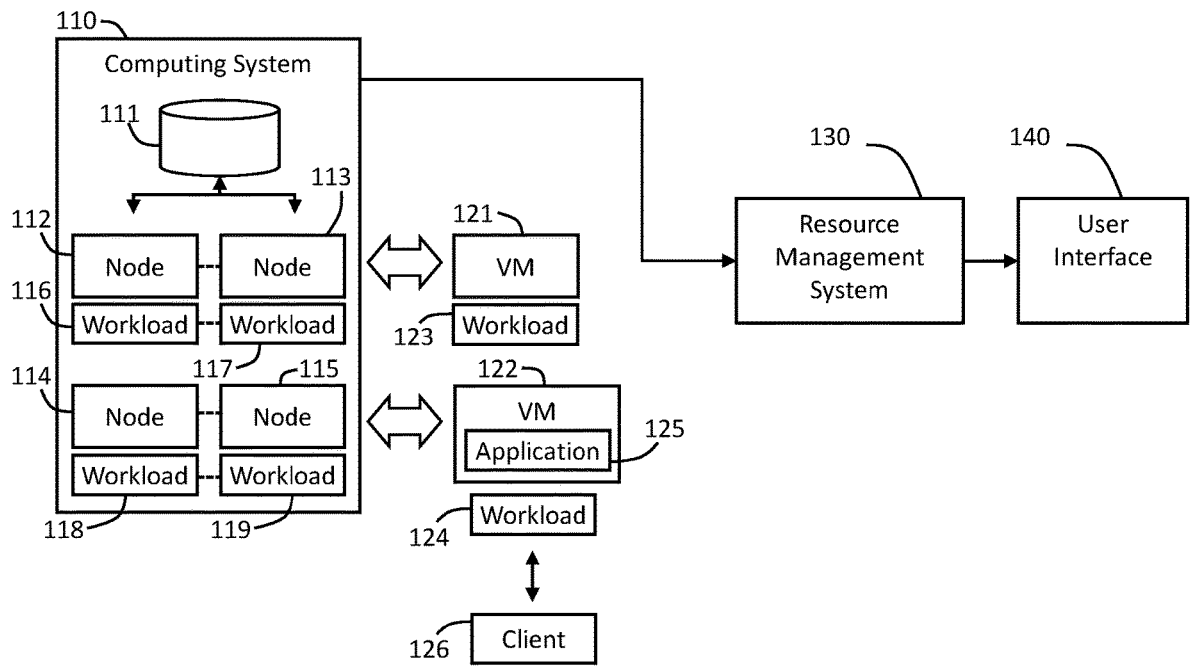
FIGS. 1A-1C illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MULTI-LAYER FORECASTING OF COMPUTATIONAL WORKLOADS
4. TIME-SERIES MODEL SELECTION AND TRAINING TO FORECAST COMPUTATIONAL WORKLOADS
5. ANOMALY DETECTION USING FORECASTED COMPUTATIONAL WORKLOADS
6. EXAMPLE EMBODIMENT
7. COMPUTER NETWORKS AND CLOUD NETWORKS
8. MISCELLANEOUS; EXTENSIONS
9. HARDWARE OVERVIEW

1. General Overview

A system predicts whether a monitored computing system will experience anomalies by comparing forecasted values associated with components in the monitored computing system to threshold values. The system utilizes time-series machine learning models to forecast workloads of computing resources in the monitored computing system. Time-series machine learning models are defined by parameters, so that changing parameter values changes a response by the model to a set of input data. A system trains and tests multiple different versions of a time-series model and selects the most accurate version to generate forecasts for a particular workload in the computing system. Tens or hundreds of combinations of parameters could be applied to a time-series model to generate predictions. In addition, when a system identifies related workloads, training and testing machine learning models for the different related workloads results in thousands or tens of thousands of permutations of parameter values.

One or more embodiments predict anomalies in a monitored computing system based on predictions associated with multiple different computing elements. For example, in response to initiating an anomaly-detection operation, the system identifies two related computing resources associated with the operation, such as two separate nodes within a node cluster. The system further identifies two separate time-series models associated, respectively, with the separate computing resources. According to one example embodiment, the different time-series models are a same type of time-series model with different parameter values. For example, two different ARIMA-type models may be associated with two different processors in a node cluster. The two different ARIMA-type models may have different p and d parameter values and the same q parameter value. The system forecasts workloads for the two processors by applying workload data to the respective models to generate two separate forecasts.

For example, a system may detect anomalies for a node cluster based on the combined forecasts for two separate nodes of the cluster running two separate processors. The forecasts associated with the separate nodes may be generated by different time-series models, or by the same type of time-series model using different parameters. For example, the system may determine that time-series data for one processor is best predicted by an ARIMA-type time-series model with a particular set of parameter values. The system may determine that the time-series data for the other processor is best predicted by a TBATS-type time-series model with a particular set of parameter values. The system may predict that no anomaly will occur when the system forecasts only one of the processors will exceed a threshold processing capacity value. Conversely, the system may predict an anomaly will occur if both processors are forecasted to simultaneously exceed respective processing capacity values.

2. System Architecture

FIG. 1 illustrates a system 100 in accordance with one or more embodiments. As illustrated in FIG. 1, the system 100 includes a computing system 110, application server 120, resource management system 130, and user interface 140.

The computing system 110 is a system being managed by the resource management system 130. The computing system 110 includes one or more data repositories 111 and one or more nodes 112, 113, 114, and 115 configured to interact with the data repository 111, with each other and other nodes, and with an application server to perform workloads. A workload is (a) an amount of computing resources and time it takes to perform one or more tasks, or (b) an application or set of operations that uses the computing resources to perform tasks. A system measures a workload with a collection of metrics. The metrics are obtained from different levels of a system. For example, in a cloud environment, a system may obtain metrics from layer-level applications including Software As a Service (SaaS), Database As a Service (DBaaS), Platform As a Service (PaaS), and Infrastructure As a Service (IaaS) applications. In addition, or in the alternative, the system may obtain metrics from entities within a cloud environment, such as a virtual machine (VM), a database server, a database, an application server, or an application. A workload may be labeled to describe the usage of a system such as an Online-transaction Processing System (OLTP) as the workload exhibits traits such as trend, seasonality, shocks, and influences both external (exogenous) and internal (endogenous).

According to one embodiment, the nodes 112-115 are nodes in a node cluster. The node cluster, including nodes 112-115, operate as a group to perform designated tasks. The nodes may be, for example, servers including processors and memory for performing tasks independently of each other. For example, one of the nodes 112-115 may be designated as a master node to receive computing tasks for a workflow and distribute the tasks among the nodes in the cluster. In addition, the nodes 112-115 may run tasks associated with different workflows. For example, each node 112-115 may be assigned to different clients. Node 112 may handle access requests to the data repository 111 from one client. Node 113 may be designated to handle access requests, concurrently with the operation of node 112, to the data repository 111 from another client. A client accessing the node cluster may interface with one server, such as a master node or load balancer. The master node or load balancer distributes data corresponding to assigned workflows to the node corresponding to the assigned workflows. The parallel operation of different nodes within the node cluster allows workloads including high numbers of separate, parallelizable tasks to be distributed among the nodes 112-115 in the cluster. In addition, or in the alternative, a node cluster may share tasks evenly between all the nodes in a cluster. The nodes 112-115 may each include its own processors and local memory. The cluster may be configured to provide fail-over capability, such that one load takes on a workload of another node in the event of a failure. The cluster may be configured to provide load balancing, such that a load balancing server manages the workloads of the respective nodes 112-115 to ensure a specified degree of balance among the loads of the respective nodes 112-115. The computing system 110 may include components of one or more data centers, collocation centers, cloud computing systems, on-premises systems, clusters, content delivery networks, server racks, and/or other collections of processing, storage, network, input/output (I/O), and/or other resources.

As illustrated in FIG. 1A, the computing system 110 runs virtual machines 121 and 122. Each virtual machine 121 and 122 is associated with a respective workload 123 and 124. The workload represents the set of tasks required to perform the functions of the virtual machine 121 or 122. Client 126 accesses the virtual machine 122 via a network. As the client 126 runs the application 125 on the virtual machine 122, the application 125 and any operating system and other applications running on the virtual machine 122 generate the tasks that make up the workload 124. The node 115 hosts the virtual machine 122. The node 115 is associated with the workload 119. The workload 119 includes, for example, the workload 124 associated with the virtual machine 122, as well as any other virtual machines, background applications, and administrative programs running on the node 115. Each node 112-115 is associated with a respective workload 116-119. In one or more embodiments, the operation of one node affects the operation of one or more additional nodes.

For example, one node may take on a part or all of another node's workload in the event of a node failure. In addition, one node may have a different hardware set, such as a high number of processing threads, that allows it to complete tasks faster than another node. A leader node or load balancer may redirect tasks from a less-efficient node to a more-efficient node to more efficiently complete tasks assigned to the node cluster. Therefore, if one node is frequently underperforming, it may add a computing burden to a node that has a better overall performance, which may result in tasks congestion and a reduced efficiency for the more efficient node.

In the example illustrated in FIG. 1A, the virtual machine 122 runs an application 125. In operation, a client device 126, such as a personal computer or other computing device, communicates with the computing system 110 including a lead server, master server, or load balancer of the node cluster to run the virtual machine 122. The node 115 designates processing capacity and memory for running the virtual machine 122. The node 115 runs the application 125 on the virtual machine. The client device 126 includes a user interface that gives a user the appearance of running the application 125 on the client device while the application 125 is being run on the node 115. In this manner, the processing capacity of the node 115 is primarily used to run the application 125, while the processing capacity of the client device 126 is used to communicate with the node 115 and display an interface associated with the running application.

Figure 1B:
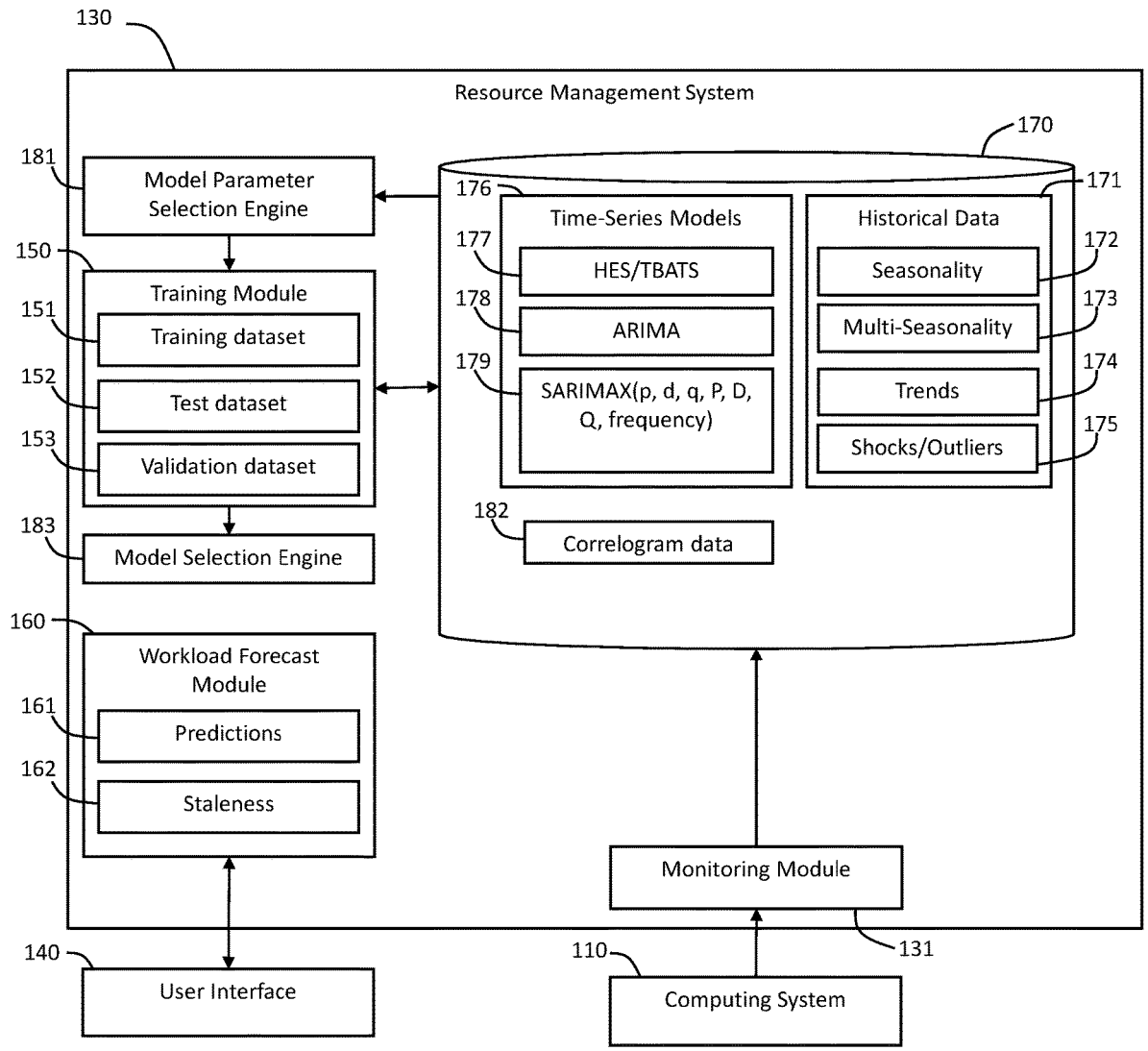

As illustrated in FIG. 1B, the resource management system 130 includes a monitoring module 131 with the functionality to monitor and/or manage the utilization or consumption of resources on the computing system 110. For example, the monitoring module 131 may collect and/or monitor metrics related to utilization and/or workloads on processors, memory, storage, network, I/O, thread pools, and/or other types of hardware and/or software resources. The monitoring module 131 may also, or instead, collect and/or monitor performance metrics such as latencies, queries per second (QPS), error counts, garbage collection counts, and/or garbage collection times on the resources. The monitoring module 131 may be implemented by any set of sensors and/or software-based monitoring applications. According to one example embodiment, the monitoring module 131 is implemented as an agent or program running in a background to other programs running on the computing system 110.

In addition, resource management system 130 may perform such monitoring and/or management at different levels of granularity and/or for different entities. For example, resource management system 130 may assess resource utilization and/or workloads at the environment, cluster, host, virtual machine, database, database server, application, application server, transaction (e.g., a sequence of clicks on a website or web application to complete an online order), and/or data (e.g., database records, metadata, request/response attributes, etc.) level. Resource management system 130 may additionally define an entity using a collection of entity attributes and perform monitoring and/or analysis based on metrics associated with entity attributes. For example, resource management system 130 may identify an entity as a combination of a customer, type of metric (e.g., processor utilization, memory utilization, etc.), and/or level of granularity (e.g., virtual machine, application, database, application server, database server, transaction, etc.). In the example illustrated in FIG. 1A, the system may define an entity as an organization associated with the client device 126. The attributes associated with the entity may include the virtual machines run by the client devices of the organization, the nodes hosting the virtual machines, the applications running on the virtual machines, and the hardware (e.g., processors, processing threads, memory) that make up the nodes hosting the virtual machines. Additional attributes may include applications, node clusters, nodes, databases, processors, memory, and workflows associated with the organization.

The monitoring module 131 stores the metrics related to the workload of the computing system 110 in the data repository 170. The stored metrics make up historical time-series data 171. The historical time-series data 171 includes time-series data and may include one or more of the following characteristics: seasonality 172, multi-seasonality 173, trends 174, and shocks or outliers 175.

The resource management system 130 includes a model parameter selection engine 181 that filters a parameter space for one or more candidate time-series models 176 to be trained by a training module 150. For example, the system 130 may receive a forecasting request associated with a particular workload in the computing system 110. The resource management system 130 may analyze a topology of the computing system 110 to identify four components corresponding to four workloads related to the workload specified in the forecast request. Training and testing Holt-Winters Exponential Smoothing (HES) and Trigonometric Seasonality Box-Cox ARMA Trend and Seasonal (TBATS) models 177, Auto-Regressive Integrated Moving Average (ARIMA) models 178, seasonal ARIMA models (SARIMA) and seasonal ARIMA models with exogenous variables (SARIMAX) models 179 to identify a model with the best fit to the historical data associated with the four separate components may involve hundreds of thousands of possible parameter variations. For example, one SARIMAX model is defined by seven parameters p, d, q, P, D, Q, and m. Each version of the model tested includes different parameter values (e.g., (1, 0, 0)(1, 0, 0)1; (2, 1, 0)(1, 1, 0)2; etc.) The computational cost and the time to perform the computations to test each version of every model with different parameter values may exceed a performance threshold (i.e., may take too long and consume too many resources) of the system 100. For example, upon receiving a forecast request, the system may require the resulting forecast within minutes rather than hours or days. Accordingly, testing various models with hundreds of thousands of possible parameter variations may exceed the system requirement. Further, the system may require the forecast while consuming only a predefined amount of resources, such as processing resources. The model parameter selection engine 181 filters the search space of parameters into a range of parameters corresponding to an execution time and a resource cost that meets system specifications.

In one embodiment, the model parameter selection engine 181 utilizes an autocorrelation function (ACF), a partial autocorrelation function (PACF), or both, to generate correlogram data 182. Correlogram data 182 includes digital data which, if converted into a visual representation, would generate a correlogram. The model parameter selection engine 181 uses the correlogram data 182 to determine a candidate set of parameter values with which to train a set of candidate time-series models. For example, the model parameter selection engine 181 may select ten combinations of parameter values for training ten different versions of a SARIMAX model.

According to one embodiment, the model parameter selection engine selects a set of candidate values for at least one parameter based on analyzing correlation values in the correlogram data 182 to a defined threshold value. For example, the model parameter selection engine 181 may select a set of candidate values that (a) are equal to, or greater than, a specified confidence threshold, and (b) are closer to the confidence threshold than each unselected candidate value.

The model parameter selection engine 181 further selects candidate parameter values by analyzing the historical time-series data to determine whether the time-series data includes seasonal patterns, multi-seasonal patterns, trends, and outliers or shocks. Based on the identified characteristics of the historical time-series data, the model parameter selection engine 181 selects particular time-series models that are likely a good fit for the historical data. For example, a model parameter selection engine 181 may compute the ACF/PACF and identify which parameters for time-series models are most likely to result in accurate forecasts. Accordingly, the ACF and/or PACF calculations filter to reduce a number of iterations of time-series model parameters the system tests to predict future workflow values. This filtering technique reduces the parameters of the time series models (p, d, q, P, D, Q, f) and their combinations of the SARIMAX-type model, to be trained to the historical data.

A training module 150 selects, from among multiple different types of models, and multiple different versions of a same model type (corresponding to multiple different combinations of parameter values) a candidate set of time-series models to be evaluated. For example, the system may compute the ACF/PACF and determine that both an ARIMA-type model and a SARIMAX-type model have a similar likelihood of being a fit for the historical data. This automation reduces the overall time it takes to compute and perform the predictions.

The training module 150 generates time-series models for various entities associated with the monitored systems using machine learning techniques. The training module 150 obtains the historical time-series data 171 for a given entity (e.g., a combination of a customer, metric, and level of granularity) from the data repository 170. The training module 150 divides the historical time-series data into a training data set 151, a test data set 152, and a validation data set 153. The training module 150 trains a set of time-series models with the training data set 151 and tests the set of time-series models using the test data set 152. The set of time-series models trained by the training module 150 includes multiple different versions of a same model type defined by different combinations of model parameters (such as p, d, and q, for an ARIMA-type model). The set of time-series models may further include different models of different types, such as a TBATS model and an ARIMAX model. Subsequent to training the time-series models with the training data set, the training module 150 validates the models using the validation data set 153. Based on the training, testing, and validation, the training module 150 generates selections of one or more time-series models for use in evaluating subsequent time-series metrics.

The resource management system 130 includes a workload forecast module 160 that uses the time-series models generated by the training module 150 to generate forecasts of metrics representing resource consumption and/or workload on the monitored computing system 110. In these embodiments, time-series models analyze time-series data that includes metrics collected from monitored systems to predict future values in the time-series data based on previously observed values in the time-series data.

In one or more embodiments, trained time-series models are stored in the data repository 170 for use in later forecasts. For example, a TBATS-type model trained on a data set associated with one entity (such as one node in a node cluster or one processor in one node) is stored for future forecasts for the same entity. Similarly, an ARIMA-type model trained on a data set associated with a different entity in the computing system 110 is stored for future forecasts for the respective entity. The time-series models 176 include one or more of a HES model and TBATS model 177, an ARIMA model 178, a SARIMAX model 179 having as parameters 154 (p, d, q, P, D, Q, frequency), or any combination of these models or alternative models.

The time-series models 176 include components to account for seasonality, multi-seasonality, trends, and shocks or outliers in the historical time-series data 171. The components of the time-series models 176 also include Fourier terms which are added as external regressors to an ARIMA model 178 or SARIMAX model 179 when multi-seasonality 173 is present in the historical time-series data 171. These components of the time-series models 176 improve the accuracy of the models and allow the models 176 to be adapted to various types of time-series data collected from the monitored systems. In one embodiment, the time-series models 176 include an exogenous variable that accounts for outliers 175 in the historical time-series data 171, to reduce or eliminate the influence the outliers 175 in the model generated with the historical time-series data 171 have on the forecasts of the workload forecast module 160.

In one or more embodiments, the time-series models 176 include one or more variants of an autoregressive integrated moving average (ARIMA) model 178 and/or an exponential smoothing model 177.

In some embodiments, the ARIMA model 178 is a generalization of an autoregressive moving average (ARMA) model with the following representation:

$$Y_t = \sum_{i=1}^{p} \phi_i Y_{t-i} + a_t - \sum_{j=1}^{q} \theta_j a_{t-j}$$

The representation above can be reduced to the following:

$\phi_p(B)Y_t = \theta_q(B)a_t$

In the above representations, $Y_t$ represents a value Y in a time series that is indexed by time step t, $\phi_1, \ldots, \phi_p$ are autoregressive parameters to be estimated, $\theta_1, \ldots, \theta_q$ are moving average parameters to be estimated, and $a_1, \ldots, a_t$ represent a series of unknown random errors (or residuals) that are assumed to follow a normal distribution.

In one embodiment, the training module 150 utilizes the Box-Jenkins method to detect the presence or absence of stationarity and/or seasonality in the historical time-series data 171. For example, the Box-Jenkins method may utilize an autocorrelation function (ACF), partial ACF, correlogram, spectral plot, and/or another technique to assess stationarity and/or seasonality in the time series.

When the training module 150 determines that only non-stationarity is found, the training module 150 may add a degree of differencing d to the ARMA model to produce an ARIMA model with the following form:

$\phi_p(B)(1-B)^d Y_t = \theta_q(B)a_t$

When the training module 150 determines that seasonality is found, the training module 150 may add a seasonal component to the ARIMA model to produce a seasonal ARIMA (SARIMA) model with the following form:

$$\emptyset_p(B)\Phi(P)(B^s)(1-B)^d(1-B^s)^D Y_t = \theta_q(B)\Theta_Q(B^s)a_t$$

In the SARIMA model, parameters p, d, and q represent trend elements of autoregression order, difference order, and moving average order, respectively; parameters P, D, and Q represent seasonal elements of autoregression order, difference order, and moving average order, respectively; and parameter s represents the number of seasons (e.g., hourly, daily, weekly, monthly, yearly, etc.) in the time series. $K_i$ In one or more embodiments, the training module 150 applies Fourier terms to the time-series models 176. For example, when multiple seasons are detected in the time series, seasonal patterns may be represented using Fourier terms, which are added as external regressors in the ARIMA model:

$$yt = a + \sum_{i=1}^{M}\sum_{k=1}^{K_i}\left[\alpha\sin\left(\frac{2\pi kt}{P_i}\right) + \beta\cos\left(\frac{2\pi kt}{P_i}\right)\right] + N_t$$

In the above equation, $N_t$ is an ARIMA process, $P_1, \ldots, P_M$ represent periods (e.g., hourly, daily, weekly, monthly, yearly, etc.) in the time series, and the Fourier terms are included as a weighted summation of sine and cosine pairs.

The time-series models 176 may include exogenous variables that account for outliers 175 in the historical time-series data 171 and represent external effects and/or shocks. In one embodiment, the training module 150 adds the exogenous variable to the ARMAX model, above, to produce an autoregressive moving average model with exogenous inputs (SARMAX) model with the following representation:

$$Y_t = \sum_{i=1}^{p}\phi_i Y_{t-i} + \sum_{k=1}^{r}\beta_k X_{t-k} + \varepsilon_t + \sum_{j=1}^{q}\theta_j a_{t-j}$$

In the above representation, $\beta_1, \ldots, \beta_r$ are parameters of time-varying exogenous input X. In additional embodiments, the training module 150 includes an exogenous variable in the ARIMA and/or SARIMAX models. In a computing system 110, the exogenous variable may represent system backups, batch jobs, periodic failovers, and/or other external factors that affect workloads, resource utilizations, and/or other metrics in the time series. These external factors may cause spikes in a workload metric that do not follow an underlying seasonal pattern of the historical time-series data 171.

In one or more embodiments, the exponential smoothing model includes a trigonometric seasonality Box-Cox ARMA Trend Seasonal components (TBATS) model. The TBATS model includes the following representation:

$$y_t^{(\lambda)} = l_{t-1} + \Phi \cdot b_{t-1} + \sum_{i=1}^{T} s_{t-m_i}^{(i)} + d_t$$

$$l_t = l_{t-1} + \Phi \cdot b_{t-1} + \alpha \cdot d_t$$

$$b_t = \Phi \cdot b_{t-1} + \beta \cdot d_t$$

$$d_t = \sum_{i=1}^{p}\varphi_i \cdot d_{t-i} + \sum_{i=1}^{q}\theta_i \cdot e_{t-i} + e_t$$

In the above representation, T is the number of seasonalities, $m_i$ is the length of the ith seasonal period, $y_t^{(\lambda)}$ is the time series Box-Cox transformed at time t, $s_t^{(i)}$ is the ith seasonal component, $l_t$ is the level, $b_t$ is the trend with damping effect, $d_t$ is an ARMA(p, q) process, and $e_t$ is Gaussian white noise with zero mean and constant variance. In addition, $\Phi$ is a trend damping coefficient, $\alpha$ and $\beta$ are smoothing coefficients, and $\varphi$ and $\theta$ are ARMA(p, q) coefficients.

The seasonal components of the TBATS model are represented using the following:

$$s_t^{(i)} = \sum_{j=1}^{k_i} s_{j,t}^{(i)}$$

$$s_{j,t}^{(i)} = s_{j,t-1}^{(i)} \cdot \cos(\lambda_i) + s_{j,t-1}^{*(i)} \cdot \sin(\lambda_i) + \gamma_1^{(i)} \cdot d_t$$

$$s_{j,t}^{*(i)} = -s_{j,t-1}^{(i)} \cdot \sin(\lambda_i) + s_{j,t-1}^{*(i)} \cdot \cos(\lambda_i) + \gamma_2^{(i)} \cdot d_t$$

$$\lambda_i = \frac{2 \cdot \pi \cdot j}{m_i}$$

In the above equations, $k_i$ is the number of harmonics required for the ith seasonal period, $\lambda$ is the Box-Cox transformation, and $\gamma_1^{(i)}$ and $\gamma_2^{(i)}$ represent smoothing parameters.

Thus, the TBATS model has parameters 154 T, $m_i$, $k_i$, $\lambda$, $\alpha$, $\beta$, $\varphi$, $\theta$, $\gamma_1^{(i)}$ and $\gamma_2^{(i)}$. The final model can be chosen using the Akaike information criterion (AIC) from alternatives that include (but are not limited to):
- with and without the Box-Cox transformation
- with and without trend
- with and without trend damping
- with and without ARMA(p, q) process to model residuals
- with and without seasonality
- variations in the number of harmonics used to model seasonal effects.

Figure 1C:
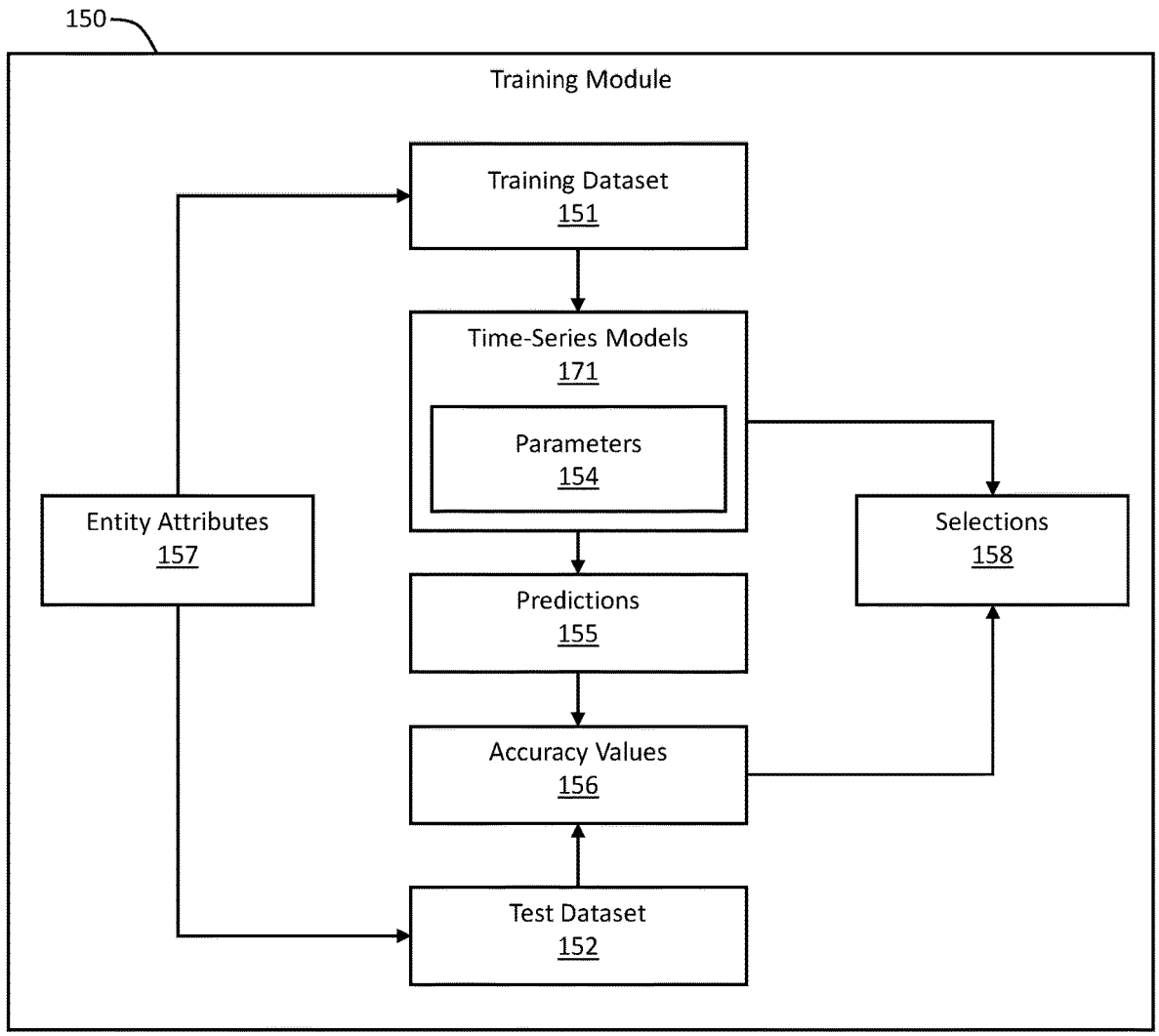

Referring to FIG. 1C, in one or more embodiments, resource management system 130 includes a training module 150 that generates time-series models 176 for various entities associated with the monitored systems using supervised learning techniques. First, training module 150 obtains historical time-series data for a given entity (e.g., a combination of a customer, metric, and level of granularity) from a data repository 170. For example, training module 150 may match entity attributes 157 for the entity to records storing historical time-series data for the entity in a database (e.g., metrics collected from the entity over the past week, month, year, and/or another period). Each record may include a value of a metric, a timestamp representing the time at which the value was generated, and/or an index representing the position of the value in the time series.

Next, training module 150 divides the historical time-series data into a training data set 151 and a test data set 152. For example, training module 150 may populate training data set 151 with a majority of the time-series data (e.g., 60-80%) and test data set 152 with the remainder of the time-series data. In some embodiments, training module 150 selects the size of test data set 152 to represent the forecast horizon of each time-series model, which depends on the granularity of the time-series data. For example, training module 150 may include, in test data set 152, 24 observations per metric spanning a day for data that is collected hourly (corresponding to one or more thousands of observations for a week-duration data set made up of hourly observations of multiple metrics); seven observations spanning a week for data that is collected daily; and/or four observations spanning approximately a month for data that is collected weekly. Training module 150 optionally uses a cross-validation technique to generate multiple training data sets and test data sets from the same time-series data.

Training module 150 uses training data set 151 to train a set of time-series models 176 with different parameters 154. For example, training module 150 uses the Box-Jenkins method and/or another method to generate a search space of parameters 154 for various ARIMA-type models (including SARIMA, ARIMAX, and/or SARIMAX) and/or TBATS-type models. Training module 150 then uses a maximum likelihood estimation (MLE) technique, ordinary least squares (OLS) technique, and/or another technique to fit each model to training data set 151.

After a set of time-series models 176 is created from training data set 151, training module 150 uses test data set 152 to evaluate the performance of each model. In particular, training module 150 uses time-series models 176 to generate predictions 155 of values in test data set 152, based on previously observed values in the time-series data. Training module 150 also determines accuracy values 156 of time-series models 176 based on comparisons of predictions 155 and the corresponding values of test data set 152. For example, training module 150 calculates a mean squared error (MSE), root MSE (RMSE), AIC, and/or another measure of model quality or accuracy between predictions 155 and corresponding test data set 152 values for all time-series models 176 generated from historical time-series data for the entity.

Finally, training module 150 generates selections 158 of one or more time-series models 176 for use in evaluating subsequent time-series metrics for the same entity, or for an entity with attributes 157 that are similar within a threshold level of similarity. For example, training module 150 includes, in selections 158, one or more time-series models 176 with the highest accuracy values 156 in predicting values in test data set 152.

After one or more best-performing time-series models 176 are selected for one or more entities, training module 150 stores parameters of each model in a model repository, such as in the data repository 170. Training module 150 also, or instead, provides a representation of the model to a monitoring module 131, user interface 140, and/or other components of resource management system 130.

The workload forecast module 160 obtains a time series of recently collected metrics for each entity from the data repository 170 and inputs the data into the corresponding time-series model 176 generated by the training module 150. In turn, the time-series model 176 outputs predictions 161 of future values in the time series as a predicted workload, resource utilization, and/or performance associated with the entity.

The monitoring module 131 includes functionality to predict anomalies based on comparisons of forecasts generated by the workload forecast module 160 with corresponding thresholds. For example, thresholds may represent limits on utilization of resources by the entities and/or service level objectives for performance metrics associated with the entities. When a forecasted metric violates (e.g., exceeds) a corresponding threshold, monitoring module 131 may detect a potential future anomaly, error, outage, and/or failure in the operation of hardware and/or software resources associated with the entity. For example, the entity within a topology that makes up a system may suffer a fault that is reflected in the time-series data as a spike or growth/trend. The prediction from the models can pick up this sudden change in resource utilisation that is reflected to the user identifying a "change" in usage that requires investigation.

When an anomaly is predicted in metrics for a given entity, monitoring module 131 communicates the predicted anomaly to one or more users involved in managing use of the monitored systems by the entity. For example, monitoring module 131 may include a graphical user interface (GUI), web-based user interface, mobile user interface, voice user interface, and/or another type of user interface that displays a plot of metrics as a function of time. The plot additionally includes representations of one or more thresholds for metrics and/or forecasted values of metrics from a time-series model for the corresponding entity. When the forecasted values violate a given threshold, the user interface displays highlighting, coloring, shading, and/or another indication of the violation as a prediction of a future anomaly or issue in the entity's use of the monitored systems. In another example, monitoring module 131 may generate an alert, notification, email, and/or another communication of the predicted anomaly to an administrator of the monitored systems to allow the administrator to take preventive action (e.g., allocating and/or provisioning additional resources for use by the entity before the entity's resource utilization causes a failure or outage).

The workload forecast module 160 includes a staleness determining module 162 that performs a recurring analysis of the selected models to determine whether the models are stale. After a period has lapsed since a given time-series model has been trained, used to generate forecasts, and/or predict anomalies, training module 150 retrains the time-series model using more recent time-series data from the corresponding entity. For example, training module 150 may regularly obtain and/or generate a new training data set 151 and test data set 152 from metrics collected over a recent number of days, weeks, months, and/or another duration. Training module 150 may use the new training data set 151 to generate a set of time-series models 176 with different combinations of parameter values and evaluate accuracies of the generated time-series models 176 using the new test data set 152. Training module 150 may then select one or more of the most accurate and/or highest performing time-series models for inclusion in model repository and/or for use by monitoring module 131 in generating forecasts and/or predicting anomalies for the entity over the subsequent period.

By forecasting resource utilizations, computational workloads, and/or other metrics related to the use of monitored systems by entities, resource management system 130 allows potential errors, failures, and/or outages in the monitored systems to be prevented, which reduces downtime in the monitored systems and/or improves the execution of applications, databases, servers, virtual machines, physical machines, and/or other components on the monitored systems. The forecasting of metrics at different levels of granularity and/or layers of technology in the monitored systems additionally allows the usage of resources by the entities to be more accurately characterized, which reduces inefficient allocation of the resources to the entities and/or inefficient provisioning of resources to meet the entities' requirements. Consequently, the system of FIGS. 1A-1C may improve the use of technologies and/or computer systems for monitoring, managing, and/or allocating computational resources.

In one or more embodiments, resource management system 130 may include more or fewer components than the components illustrated in FIGS. 1A-1C. For example, training module 150 and monitoring module 131 may include, execute with, or exclude one another. The components illustrated in FIGS. 1A-1C may be local to or remote from each other. The components illustrated in FIGS. 1A-1C may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository (e.g., data repository 170) is any type of storage unit and/or device (e.g., a file system, database, collection of tables, or any other storage mechanism) for storing data. The data repository may be implemented or may execute on the same computing system as training module 150, workload forecast module 160, and monitoring module 131 or on a computing system that is separate from training module 150, workload forecast module 160, and monitoring module 131. The data repository may be communicatively coupled to the training module 150, workload forecast module 160, and monitoring module 131 via a direct connection or via a network. Further, the data repository may include multiple different storage units and/or devices. The multiple different storage units and/or devices may or may not be of the same type or located at the same physical site.

In one or more embodiments, resource management system 130 refers to hardware and/or software configured to perform operations described herein for forecasting computational workloads. Examples of such operations are described below.

In an embodiment, resource management system 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a user interface 140 refers to hardware and/or software configured to facilitate communications between a user and resource management system 130. The user interface 140 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface 140 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface is specified in one or more other languages, such as Java, C, or C++.

3. Multi-Layer Forecasting of Computational Workloads

Figure 2:
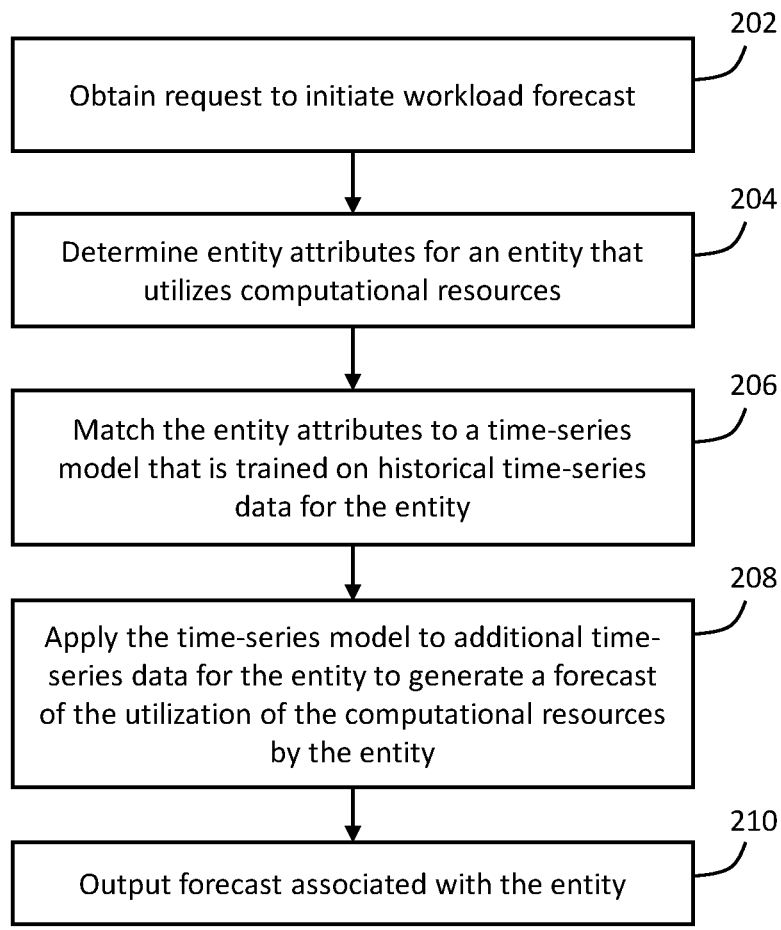
FIG. 2 illustrates an example set of operations for multi-layer forecasting of workloads in accordance with one or more embodiments.

FIG. 2 illustrates an example set of operations for multi-layer forecasting of computational workloads in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

The system determines entity attributes for an entity that utilizes computational resources (operation 204). For example, the entity attributes may be retrieved from a data repository and/or received in a request. The entity attributes may include a level of granularity associated with components utilizing the computational resources (e.g., virtual machine, database, application, application server, database server, transaction, etc.), a metric representing the utilization of the computational resources (e.g., processor, memory, network, I/O, storage, and/or thread pool usage), and/or a user or organization representing a customer or owner of the components. The entity attributes may describe a topology associated with a particular workload at a specified level of granularity.

For example, the system may receive a request to perform workload forecasting for a particular virtual machine. The request may specify a node-type level of granularity. In other words, the system identifies any nodes associated with the performance of the virtual machine and initiates the forecast operation by analyzing workloads of the nodes. Responsive to the request and the specified level of granularity, the system may identify (a) a target node hosting the target virtual machine, and (b) a sibling node that is part of the same node cluster as the target node. According to an alternative embodiment, the request may specify a processing component level of granularity. Accordingly, the system may identify attributes of processor-cores and memory access requests associated with processors and memory of nodes supporting a particular virtual machine workload. Determining the entity attributes may include (a) identifying workloads of the target node and the sibling node, and (b) determining hardware, such as CPU attributes, processor-core attributes, and memory attributes associated with both the target node and the sibling node. According to one or more embodiments, the system determines a level of granularity for analyzing and forecasting workloads based on settings associated with forecast operations. The level of granularity may be specified in a request generated by a user via a user interface, it may be specified in stored settings associated with particular users, particular nodes, particular node clusters, and/or particular virtual machines.

The entity attributes are matched to a time-series model that is trained on historical time-series data for the entity (operation 206). For example, the entity attributes may be used as keys in a lookup of the time-series model in a model repository and/or an environment in which the time-series model is deployed. As an example, a set of entity attributes may describe the entity topology at a particular level of granularity, such as: 4 nodes of a node cluster, each node including 8 processors, 3 nodes including processors of type A with X number of processor cores each, 1 node including processors of type B with Y number of processor cores each. Another, more generalized, level of granularity associated with an entity topology may include: 1 node running a virtual machine and accessing a database of a type D and 1 sibling node in the same node cluster. The system compares a specified topology with stored topologies associated, respectively, with stored time-series models trained on historical time-series data for the respective topologies.

The time-series model is then applied to additional time-series data for the entity to generate a forecast of the utilization of the computational resources by the entity (operation 208). For example, recently collected utilization metrics for the entity are inputted into the time-series model, and the time-series model generates output representing predictions of future values for the utilization metrics.

The forecast is output in association with the entity (operation 210). For example, the predicted future values may be displayed and/or outputted in a chart, table, log, file, and/or other representation. In turn, a representative of the entity and/or a manager of the computational resources can use the predicted future values to adjust allocation of resources to the entity and/or provision additional resources in anticipation of increased workload on the resources.

Operations 202-208 may be repeated for remaining entities that utilize the computational resources. For example, a time-series model may be retrieved for each entity that utilizes resources in a cloud and/or distributed system, and a forecast of the entity's resource utilization is generated and outputted to facilitate subsequent management, allocation, and/or provisioning of the resources.

Figure 3:
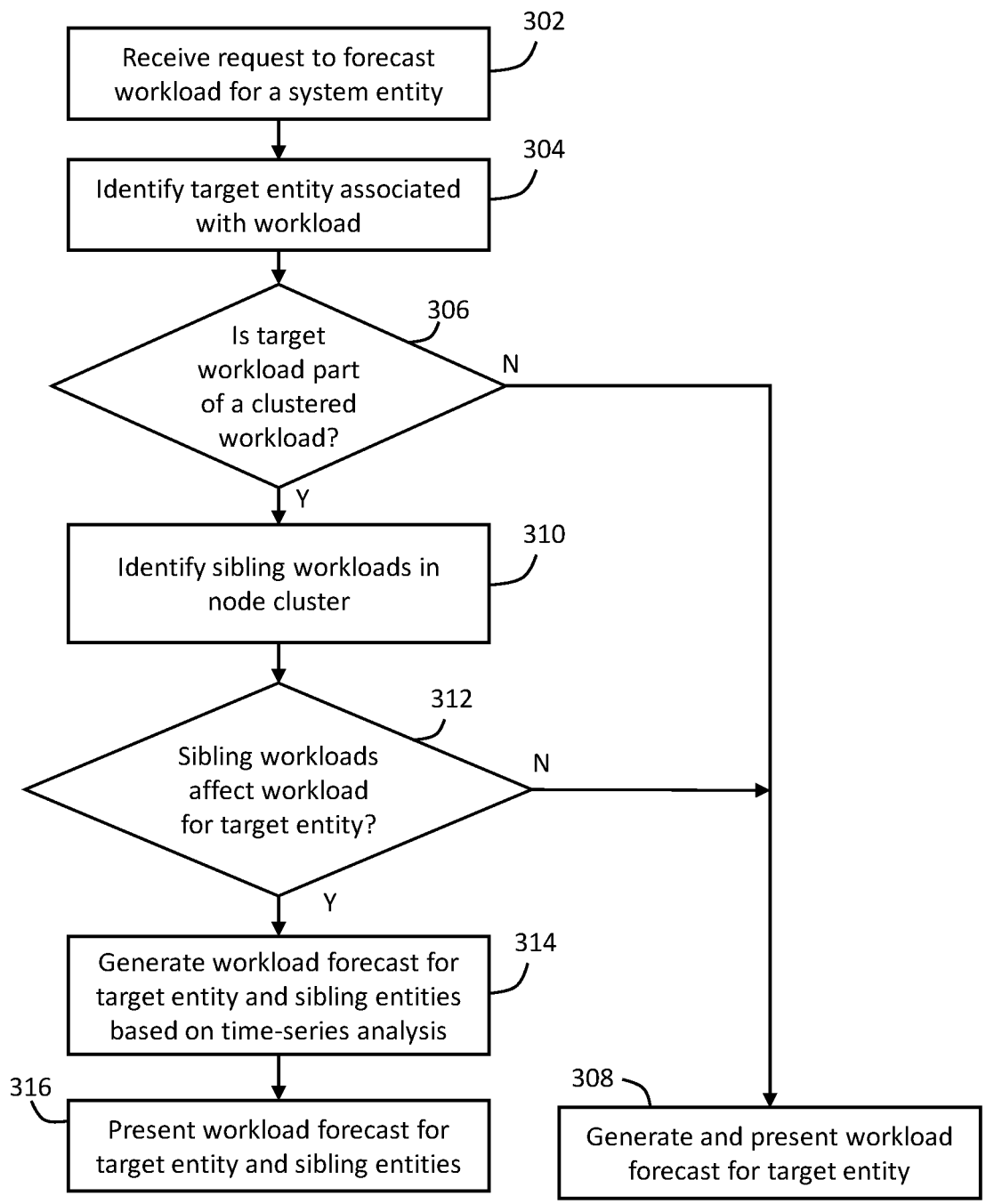
FIG. 3 illustrates an example set of operations for forecasting workloads in a multi-node cluster environment in accordance with one or more embodiments.

FIG. 3 illustrates an example set of operations for multi-layer forecasting of workloads for entities in a system in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system receives a request to forecast a workload for a particular system entity (Operation 302). A system entity includes a particular set of system computational resources at a particular level of granularity. Examples of system entities include: a virtual machine, a node hosting the virtual machine, a node cluster to which the host node belongs, hardware and software executing tasks to execute workflows, a database, a node cluster supporting a database, applications, and clusters of nodes supporting one or more applications.

In an example embodiment in which the entity is a virtual machine, as the virtual machine operates on an underlying node or server, it generates a workload of tasks for processing and memory components to perform. The system obtains a request to forecast characteristics of the workload for the virtual machine in the future. For example, the forecast may include a bandwidth utilized on network infrastructure, processing and CPU utilization, requests to memory, and access requests to shared resources, such as a database accessible by the target node and one or more additional nodes.

The system identifies a target entity associated with the workload identified in the forecast request (Operation 304). The target entity is associated with a level of granularity associated with the forecast request. For example, the forecast request may include a request to forecast a workload for a virtual machine. The request may be associated with a level of granularity specifying attributes of servers in a server cluster hosting the virtual machine. The system may determine that the virtual machine is maintained by a particular node of a node cluster. While from the perspective of a client device, requests are transmitted to a particular address associated with a leader node in the node cluster, or with a load balancer, the system identifies as a target entity associated with the forecast request the particular node in the cluster to which the lead node or load balancer directs the requests.

The system determines whether the target workload identified in the forecast request is part of a clustered workload (Operation 306). A clustered workload is a workload that is executed by one or more nodes in a cluster of nodes. Each of the one or more nodes may execute separate workloads. The separate workloads may correspond to tasks of a same workload or tasks of different workloads. For example, one node may execute a workload associated with one virtual machine. Another node may execute a workload associated with a different virtual machine. Alternatively, two nodes may execute workloads that are shared across the cluster of virtual machines. According to another example, multiple workloads may run on the same virtual machine.

If the system determines that the target workload is not part of a workload cluster, the system generates a workload forecast for the target workload in response to the request to generate a forecast for the target entity workload (Operation 308). The system generates the forecast for the target workload by applying a time-series model trained on a set of attributes associated with the target entity to time-series attribute data from the target entity. The system generates a forecast for the target entity that includes not only a forecast based on predicted workload attributes for a requested workload associated with the target entity, but also predicted workload attributes for any other operations performed by the target entity. For example, if the target entity is a node hosting a virtual machine, the system generates the forecast for the node that includes not only a forecast based on predicted workload attributes for a requested workload associated with the virtual machine, but also predicted workload attributes for any other operations performed by the node that hosts the virtual machine.

A particular node may host multiple virtual machines corresponding to one or more tenants. For example, a server may be partitioned to provide different tenants with access to computing and/or memory resources. The partition may designate particular processing and/or memory resources for different tenants at all times. Alternatively, the partition may include temporal specifications to allow tenants to access shared resources as different times. One tenant may be granted access to a set of processing resources at one period of time, and another tenant may be granted access to the same set of processing resources at another period of time. In addition to virtual machines, a node may provide access to operating systems and applications. The operating systems and applications may be provided to external client devices as part of, or separate from, virtual machines. Accordingly, the operations of other applications performed by the node, such as workflows associated with additional virtual machines, affect a target workload associated with a target virtual machine. According to one example, the system generates and presents (a) the forecast for the target workload associated with a target virtual machine, and (b) at least one additional forecast associated with at least one additional workload associated with at least one additional virtual machine hosted by the target node.

If the system determines that the target workload is part of a workload cluster, the system identifies additional workloads in the workload cluster (Operation 310). The workload cluster may comprise a set of workloads executed by two or more nodes in a node cluster. The two or more nodes include, for example, servers having separate processors and memory and capable of executing workloads independently of each other. The system may determine a relationship between the target workload and any additional workloads in the workload cluster. For example, the system may determine whether the nodes executing the workloads communicate with each other. The system may determine whether the nodes executing the workloads access a same set of shared resources. The system may determine whether one node is designated to take over tasks of another node in the event of a failure. The system may identify any leader nodes in the node cluster executing a workload cluster. The system may further identify any load balancer that distributes requests among nodes in the cluster executing the workload cluster.

According to one embodiment, the system analyzes time-series data for the target entity associated with the target workload and one or more sibling entities associated with sibling workloads to identify an extent to which execution of the sibling workloads affects execution of the target workload (Operation 312). For example, a sibling node in a node cluster may be susceptible to frequent communication failures which may result in periodic workflow increases to a target node as a leader node redirects tasks from the sibling node to the target node. In addition, a sibling node performing frequent access requests to a shared database to execute a sibling workload may result in delays for the target node attempting to access the shared database for the target workload. The system may determine whether the effect of a sibling workload on a target workload exceeds a threshold value. For example, the system may calculate whether, based on historical time-series data, characteristics or events associated with a sibling workload degrade performance of the target workload by more than 10% at least once in a specified period of time (such as one day, one week, one month).

If the system determines that a sibling workload does not affect operation of the target workload beyond a threshold level, the system generates and presents a workload forecast for the target workload without generating a workload forecast for the sibling workloads (Operation 308). As described in connection with FIG. 2, generating a workload forecast includes selecting a time-series forecasting model based on entity attributes, or in other words, an entity topology. Generating the workload forecast for the target workload without generating the workload forecast for the sibling workloads may include omitting the sibling node(s) in a node cluster executing a clustered workload from the entity attributes when selecting the time-series forecasting model.

If the system determines that a sibling workload does affect operation of the target workload beyond a threshold level, the system generates a workload forecast for the target workload for the sibling workloads (Operation 314). Generating the workload forecast for the target workload and for the sibling workload includes obtaining entity attributes for a target entity associated with the target workload and for sibling entities associated with the sibling workloads. For example, the system may generate a separate forecast for each of a target node and sibling nodes in a node cluster executing a workload cluster. Presenting separate forecasts provides a visual indicator of the relationship between the sibling node workflows and the target node workflow. According to an alternative embodiment, generating the workload forecast for the target workload and for the sibling workloads includes generating a single forecast based on the combined entity attributes of the target entity and the sibling entities. As described in connection with FIG. 2, generating a workload forecast includes selecting a time-series forecasting model based on entity attributes, or in other words, an entity topology. In the example embodiment in which the target entity is a node hosting a virtual machine, generating the workload forecast for the target entity and for the sibling entities includes generating a workflow forecast for the target node based on entity attributes associated with the target node, and generating a workflow forecast for at least one sibling node based on entity attributes associated with the sibling node. While the target node and sibling node may share some entity attributes—such as attributes of shared resources and interconnected leader nodes or load balancers—other entity attributes are particular to the respective target node and sibling node. For example, the target node has a particular configuration of processors and memory that is separate from that of the sibling node. Accordingly, the system may select one time-series forecasting model to forecast the workflow for the target node and another time-series forecasting model to forecast the workflow for the sibling node.

The system presents a workload forecast for the target entity and the one or more sibling entities (Operation 316). For example, the predicted future values may be displayed and/or outputted in a chart, table, log, file, and/or other representation. In turn, a representative of the entity and/or a manager of the computational resources can use the predicted future values to adjust allocation of resources to the entity and/or provision additional resources in anticipation of increased workload on the resources.

Figure 4:
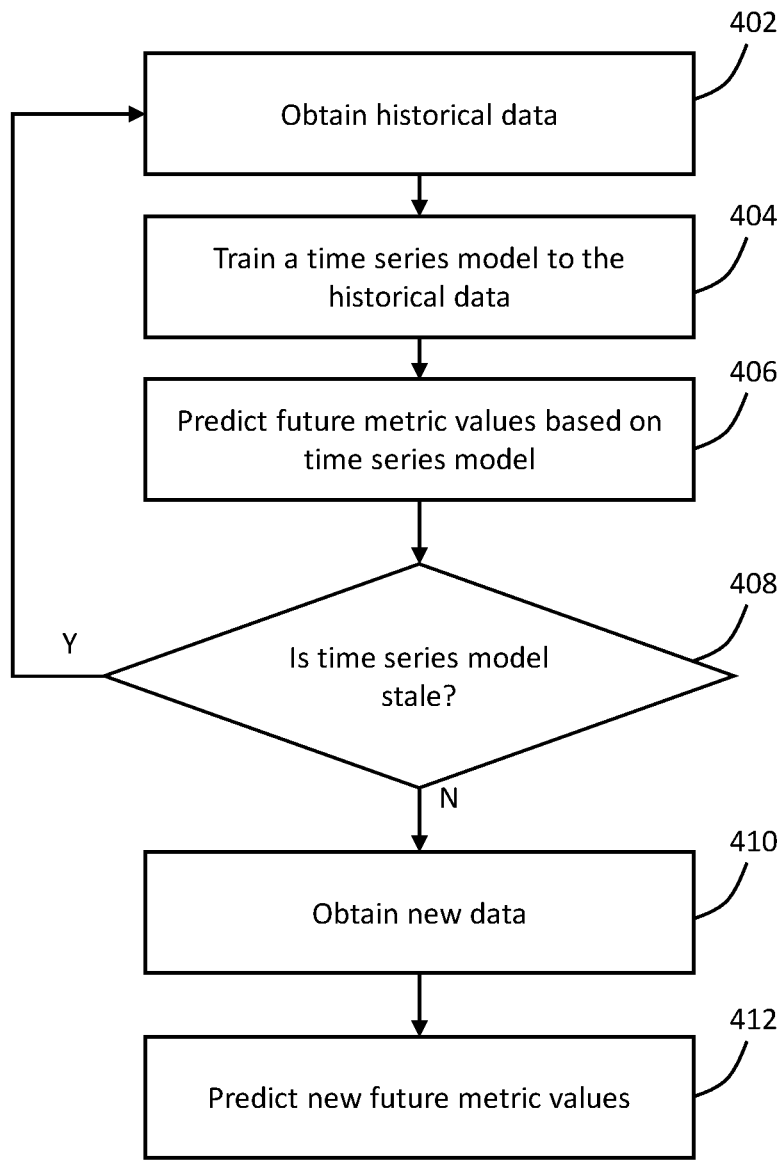
FIG. 4 illustrates an example set of operations for determining data staleness while performing time-series analysis in accordance with one or more embodiments.

4. Time-Series Model Selection and Training to Forecast Computational Workloads FIG. 4 is an example set of operations for performing time-series analysis for forecasting computational workloads in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a resource management system for a monitored system obtains historical time-series data containing metrics collected from the monitored system (Operation 402). The resource management system may obtain the historical time-series data for a given entity (e.g., a combination of a customer, metric, and level of granularity) from a data repository. For example, a resource management system may match entity attributes for an entity to records storing historical time-series data for the entity in a database (e.g., metrics collected from the entity over the past week, month, year, and/or another period). Each record may include a value of a metric, a timestamp representing the time at which the value was generated, and/or an index representing the position of the value in the time series.

The resource management system trains at least one time-series model to the historical data (Operation 404).

Figure 5:
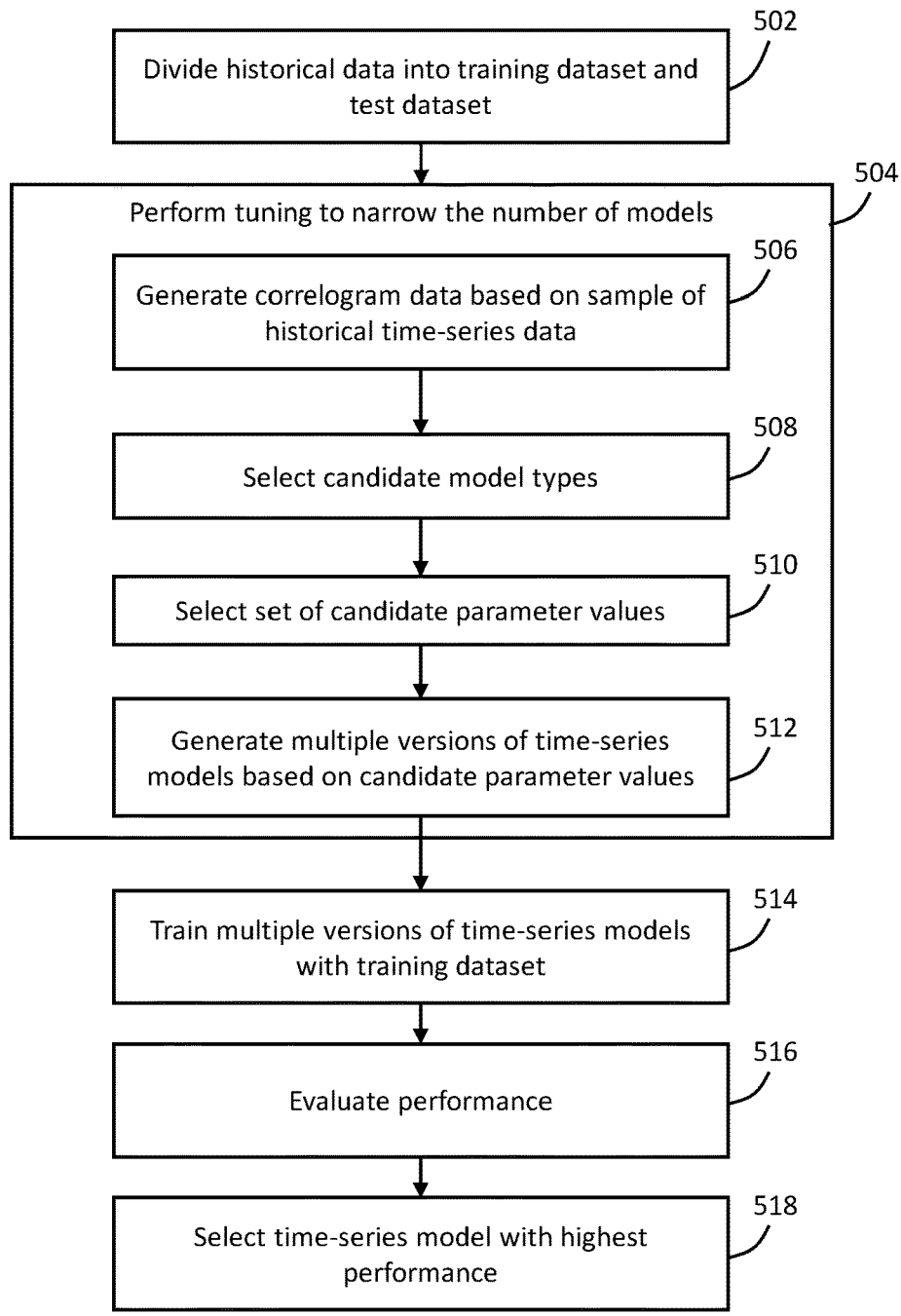
FIG. 5 illustrates an example set of operations for training time-series models in accordance with one or more embodiments.

FIG. 5 illustrates a process by which the resource management system trains a time-series model to historical data. In one or more embodiments, one or more of the steps may be omitted, repeated, and/or performed in a different order.

Accordingly, the specific arrangement of steps shown in FIG. 5 should not be construed as limiting the scope of the embodiments.

The resource management system divides the historical time-series data into a training data set and a test data set to train a set of time-series modes (Operation 502). For example, the resource management system may populate training data set with a majority of the time-series data (e.g., 70-80%) and a test data set with the remainder of the time-series data. In some embodiments, the resource management system selects the size of test data set to represent the forecast horizon of each time-series model, which depends on the granularity of the time-series data. For example, the resource management system may include, in test data set, 24 observations spanning a day for data that is collected hourly; seven observations spanning a week for data that is collected daily; and/or four observations spanning approximately a month for data that is collected weekly. The resource management system optionally uses a cross-validation technique to generate multiple training data sets and test data sets from the same time-series data.

The resource management system performs a tuning operation to narrow down the number of models to be analyzed (Operation 504).

The system resource management system generates correlogram data based on a sample of the historical time-series data (Operation 506). In one embodiment, the resource management system utilizes an autocorrelation function (ACF), a partial autocorrelation function (PACF), or both, to generate correlogram data. Correlogram data includes digital data which, if converted into a visual representation, would generate a correlogram.

The system analyzes the historical time-series data to select one or more candidate model types for a particular set of historical time-series data (Operation 508). The system determines whether the time-series data includes seasonal patterns, multi-seasonal patterns, trends, and outliers or shocks. Based on the identified characteristics of the historical time-series data, the resource management system selects particular time-series models that are likely a good fit for the historical time-series data. The system may select from among multiple different types of models to be trained to the historical data, and different types of models may be fit to the training data set to be evaluated. For example, the system may compute the ACF/PACF and determine that both an ARIMA-type model and a SARIMAX-type model have a similar likelihood of being a fit for the historical data. The system may select a TBATS-type model for forecasting time-series data based on detecting characteristics of multi-seasonality in the historical time-series data.

The system analyzes the correlogram data to determine a candidate set of parameter values to be used by the time-series models (Operation 510). The system analyzes the correlogram data to determine a candidate set of autoregressive terms to be used by the time-series models. For example, using an autocorrelation function, a set of time-series data is copied, and the copy is adjusted to lag the original set of time-series data. By comparing the original set of time-series data with multiple copies having different lag intervals, the system identifies sets of parameter values for time-series models that are likely to result in the most accurate predictions.

According to one embodiment, the set of candidate parameter values is selected based on determining a correlation value (a) is equal to, or greater than, a specified confidence threshold, and (b) a difference between the correlation value and the confidence threshold. Among a group of correlation values exceeding the correlation value, the system selects as candidate parameter values those which are closest to the confidence threshold, or those for which a difference between the correlation values and the confidence threshold is less than others. For example, the system may be configured to select a particular number of candidate parameter values from among a total number of candidate values. If the correlogram data includes twenty correlation values, the system may be configured to select five parameter values associated with the five correlation values, from among the twenty, (a) which are equal to, or greater than, a specified confidence threshold, and (b) for which a difference between the correlation value and the confidence threshold is the least, among the twenty correlation values. For example, among six correlation values which are equal to, or greater than, the specified confidence threshold, the system selects parameter values associated with the five correlation values closest to the confidence threshold. The system refrains from selecting the sixth parameter value associated with a correlation value farther from the confidence threshold than the other five correlation values.

The system analyzes the ACF and/or PACF analysis to filter a number of versions of time-series models the system tests to predict future workflow values. For example, in a SARIMAX-type model, including parameters (p, d, q, P, D, Q, f), the system may select as candidate models four different values for "p" from among thirty or more potential values for "p," based on an analysis of correlogram data. The system may select two different values for "d," two different values for "q," four different values for "P," etc. This filtering technique (a) results in a set of two or more trained time-series models from among which the system may select the most accurate model for forecasting time-series data, and (b) reduces the parameters of the time series models (p, d, q, P, D, Q, f) and their combinations of the SARIMAX-type model, to be trained to the historical data.

Upon selecting the candidate model types and different sets of parameter values for each candidate model type, the resource management system generates multiple different versions of the candidate model types (Operation 512). For example, the system may store a set of ARIMA-type models with four different values for the parameter p, two different values for the parameter d, and two different values for the parameter q, totaling 16 different ARIMA-type models with different combinations of values for p, d, and q.

The system trains the different versions of the time-series models with the training data set obtained from the historical data (Operation 514). Specifically, the system uses the training data set to train the set of time-series models with different parameters. The system applies a maximum likelihood estimation (MLE) technique, ordinary least squares (OLS) technique, and/or another technique to fit each model to the training data set.

After the system creates a set of time-series models from the training data set, the system evaluates the performance of each model using the test data set obtained from the historical data (Operation 516). The system applies the test data set to the time-series models to generate predictions of values of computing system metrics. The system also determines the accuracy of each time-series model in forecasting the computing system metrics. For example, the system calculates a mean squared error (MSE), root MSE (RMSE), AIC, and/or another measure of model quality or accuracy between predictions and corresponding test data set values for all time-series models generated from historical time-series data for the entity.

In one embodiment, the time-series models include exogenous variables to account for spikes or outliers in the historical data. In one embodiment, future data points predicted by the time-series models do not incorporate any influence of the exogenous variable. In an alternative embodiment, future data points predicted by the time-series model incorporate an influence of the exogenous variable by accepting as input a value for the exogenous variable. In addition, or in the alternative, in one embodiment, the time-series model incorporates an influence of the exogenous variable on future data points predicted by the first time-series model by reducing a weight given to the exogenous variable relative to other variables in the first time-series model representing a seasonality pattern in the historical data.

In one embodiment, the resource management system utilizes Fourier transforms of the time-series model to determine the accuracy of the time-series models. The resource management system applies the Fourier transforms to the time-series models to compare the time-series models to the test data set to determine the accuracy of the respective time-series models.

Based on comparing the accuracy of the different versions of the time-series models, the system selects a time-series model to generate forecasts for the particular entity in the computing system (Operation 518). For example, the system determines that a particular version of a time-series model, corresponding to a particular set of parameter values, was the most accurate model for predicting metric values for the entity in the computing system. The system selects the particular time-series model to generate predictions of metric values for the entity.

After the best-performing time-series model has been selected for an entity, the system stores the model and corresponding parameters in a model repository. In addition, or in the alternative, the system may provide a representation of the model to a monitoring module, a user interface, and/or other components of resource management system.

According to one or more embodiments, the operations of (a) generating candidate time-series models, and (b) selecting trained time-series models from among the candidates, inclusive of operations 502-518, are performed by a computer, without user intervention. The computer obtains a set of historical data associated with an entity in a computing system. The system may obtain the historical data based on a human request. Alternatively, the system may obtain the data based on detecting a particular criterion, such as a time-series model associated with the particular entity being stale. The computer identifies characteristics within the data, such as randomness, stationarity, trend, and seasonality. The computer generates correlogram data. The computer selects a specified number of different parameters for a corresponding time-series model type. The computer trains and tests candidate versions of the time-series model. The computer selects a best-performing model to predict future values for the entity. The computer may present the model to a user interface and/or store the model for generating the predictions.

Returning to FIG. 4, in one or more embodiments, a system uses selected time-series models to generate forecasts of time-series metrics (Operation 406). For example, the system may forecast workloads and/or utilizations related to processor, memory, storage, network, I/O, thread pools, and/or other types of resources in the monitored systems.

To generate forecasts, the system inputs a time series of recently collected metrics for each entity into the corresponding time-series model for that entity. In turn, the time-series model outputs predictions of future values in the time series as a predicted workload, resource utilization, and/or performance associated with the entity.

The system may additionally include functionality to predict anomalies based on comparisons of forecasts with corresponding thresholds. For example, thresholds may represent limits on utilization of resources by the entities and/or service level objectives for performance metrics associated with the entities. When a forecasted metric violates (e.g., exceeds) a corresponding threshold, the system may detect a potential future anomaly, error, outage, and/or failure in the operation of hardware and/or software resources associated with the entity.

When an anomaly is predicted in metrics for a given entity, the system communicates the predicted anomaly to one or more users involved in managing use of the monitored systems by the entity. For example, the system may include a graphical user interface (GUI), web-based user interface, mobile user interface, voice user interface, and/or another type of user interface that displays a plot of metrics as a function of time. The plot additionally includes representations of one or more thresholds for metrics and/or forecasted values of metrics from a time-series model for the corresponding entity. When the forecasted values violate a given threshold, the user interface displays highlighting, coloring, shading, and/or another indication of the violation as a prediction of a future anomaly or issue in the entity's use of the monitored systems. In another example, monitoring module may generate an alert, notification, email, and/or another communication of the predicted anomaly to an administrator of the monitored systems to allow the administrator to take preventive action (e.g., allocating and/or provisioning additional resources for use by the entity before the entity's resource utilization causes a failure or outage).

The system continually monitors the time-series models used to predict future metrics for an entity to determine whether the models are stale (Operation 408). The system determines that a time-series model is stale if its error rate exceeds a predetermined threshold or if a predetermined period has elapsed. According to one embodiment, the system determines that a time-series model is stale if a root mean squared error (RMSE) falls below 95% accuracy. Alternative embodiments encompass any desired level of accuracy of the time-series model. For example, a system may be configured to determine that a time-series model is stale if an RMSE falls below 85% accuracy or 90% accuracy. According to one embodiment, the threshold is configurable by a user. In addition, or in the alternative, the system may determine that the time-series model is stale if more than one week has elapsed since it was trained. While a week is provided as an example of a time-table for determining if a time-series model is stale, embodiments encompass any period of time, which may be adjusted according to the granularity of the historical data and forecasts.

After a period has lapsed since a given time-series model has been trained, used to generate forecasts, and/or predict anomalies, the system retrains the time-series model using more recent time-series data from the corresponding entity (Operation 402). For example, the system may regularly obtain and/or generate a new training data set and test data set from metrics collected over a recent number of days, weeks, months, and/or another duration. The system may use the new training data set to generate a set of time-series models with different combinations of parameter values and evaluate accuracies of the generated time-series models using the new test data set. The system may then select one or more of the most accurate and/or highest performing time-series models for inclusion in model repository and/or for use by monitoring module in generating forecasts and/or predicting anomalies for the entity over the subsequent period.

If the system determines that the time-series model is not stale, the resource management system obtains a time series of newly-collected metrics for each entity (Operation 410). The system provides the newly-collected metrics to the time-series model to predict new future values (Operation 412).

5. Anomaly Detection Using Forecasted Computational Workloads

Figure 6:
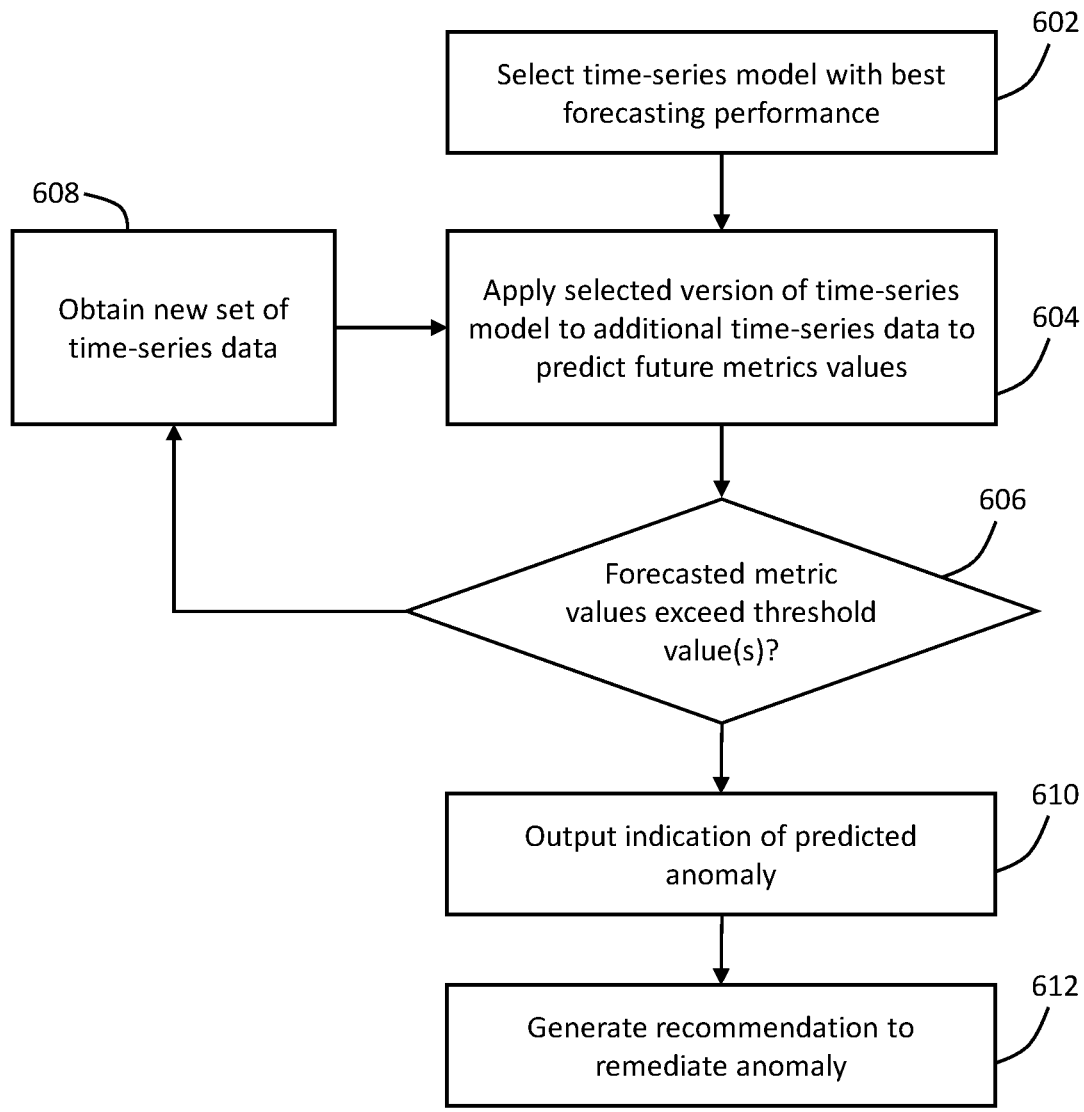
FIG. 6 illustrates an example set of operations for anomaly detection using forecasted computational workloads in accordance with one or more embodiments.

FIG. 6 illustrates a flowchart of anomaly detection using forecasted computational workloads in accordance with one or more embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a resource management system selects a version of a time-series model with a best performance in predicting metrics from among multiple versions of the time-series model fitted to historical time-series data containing the metrics collected from a monitored system (Operation 602). For example, as illustrated in FIG. 5, the version may be selected from multiple versions with different combinations of parameters used to create the time-series model.

Next, the resource management system applies the selected version to additional time-series data collected from the monitored system to generate a prediction of future values from the metrics (Operation 604). For example, the resource management system may apply the selected version of the time-series model to running sets of time-series data. According to one example embodiment, the resource management system applies the time-series model to a set of time-series data representing thirty days, divided into daily increments. Each day, the resource management system generates a new set of time-series data by removing the data for the oldest day from the data set and adding data from a most recent day into the data set. Accordingly, each day, the resource management system generates a forecast for resource usage of a particular resource for the next thirty days.

According to one embodiment, the system generates forecasts at regular intervals. In addition, or in the alternative, the system may generate a forecast upon receiving a request from a user or application. The request may specify a particular workload for which a forecast is requested.

The resource management system compares the predicted metrics values to a threshold to determine whether the predicted values exceed the threshold (Operation 606). The predetermined threshold may include a value, a number of times a predicted metric exceeds a particular value, and a frequency with which a predicted metric exceeds a threshold. For example, the system may forecast database access requests. The system may determine whether the forecasted database access requests exceed a threshold number of database access requests. In addition, or in the alternative, the system may forecast how many times within a thirty-day period the number of database access requests exceed the threshold number of database access requests.

According to one embodiment, the threshold includes two or more thresholds. For example, the system may initiate an anomaly detection operation associated with a particular workload. The system identifies two processors of two different nodes in a node cluster that are associated with the workload. The system applies a first set of time-series data generated by one processor to a first time-series model trained to generate forecasts for the processor. The system applies a second set of time-series data generated by the other processor to a second time-series model trained to generate forecasts for the other processor. The different time-series models may be one of (a) the same time-series model type with the same parameter values, (c) the same time-series model type with different parameter values, or (c) different types of time-series models. The system compares a first set of forecasts corresponding to one processor with one threshold. The system compares a second set of forecasts corresponding to the other processor with another threshold. The thresholds may be the same value (e.g., processor utilization rate of 80%), or different values. For example, the system may determine whether one processor will operate at a utilization rate of 80% and the other processor at 90%. The system may select the thresholds according to characteristics of the processors. For example, one processor may have a higher processing capacity than the other processor. Accordingly, the threshold for one processor may be higher than for the other processor. Determining whether a forecast exceeds a threshold may include determining (a) whether both processors are forecasted to simultaneously exceed their respective thresholds, or (b) whether at least one of the two processors is forecasted to exceed its threshold. The threshold may be a combination of two or more thresholds. For example, the system may determine that predicted metric values exceed a threshold if either processor is predicted to exceed a 90% processor utilization rate (regardless of the predicted utilization rate of the other processor), or if both processors simultaneously are predicted to exceed an 80% utilization rate.

According to one embodiment, the system obtains thresholds based on user input. For example, the user may set a threshold to identify an anomaly when a particular metric (a) meets a particular value, (b) exceeds a particular value, or (b) falls below a particular value. According to an alternative embodiment, the system applies a machine learning model to time-series data to identify a threshold for a particular entity of the computing system. The system may use a machine learning algorithm to identify a threshold value or set of values for a particular system component in the monitored system. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables (e.g., sets of time-series metrics for a computing component in a monitored system) for the target model f. The associated labels are associated with the output variable (e.g., an anomaly condition) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn a threshold value or set of threshold values associated with a set of metric values. In an embodiment, a set of training data includes labeled sets of time-series values for a particular metric of a computing component, such as a number of access requests to a database. The sets of time-series data are associated with labels, indicating an anomaly occurred in the set of training data.

If the system determines that the forecasted metrics values do not exceed the threshold, the system obtains a new set of time-series data (Operation 608). For example, the system may be configured to generate a daily prediction of future metrics values for workloads in a monitored system. Accordingly, each day the system obtains a new set of time-series data to generate forecasts. Alternatively, the system may be configured to generate forecasts at any regular time interval, such as hourly, weekly, monthly, or quarterly. According to one embodiment, the system generates forecasts daily and trains a new time-series model after a week to generate forecasts. In addition, or in the alternative, the system may obtain the new set of time-series data based on a request from a user or application to generate a forecast. For example, a user may interact with a user interface to request a forecast of a node cluster in a cloud environment to determine whether the present configuration of the node cluster will meet the needs of a client over the next three months.

Based on determining that the forecasted metric exceeds the threshold, the resource management system generates an indication of a predicted anomaly in the monitored system (Operation 610). For example, the predicted future values are compared with a threshold representing an upper limit for the metrics (e.g., 80% utilization of a resource). When some or all of the predicted future values exceed the threshold, an alert, notification, and/or another communication of the violated threshold is generated and transmitted to an administrator of the monitored system. For example, the system may generate a notification that usage of a particular node cluster accessing a database exceeds a threshold usage. The system may recommend reconfiguring a cloud environment to add one or more nodes to a node cluster, to upgrade attributes of one or more nodes, or to reconfigure which applications access the node cluster.

While an example is described above in which the system determines whether a forecasted metric value exceeds a threshold value, embodiments include determining whether a forecasted metric value is less than a threshold value. For example, the system may determine that if a particular CPU of a particular node has a forecasted utilization rate below 10% for a thirty-day period, the system may improve efficiency by redirecting some operations from other CPUs to the particular CPU. The threshold may include a combination of an upper threshold and a lower threshold. In addition, the system may select different thresholds for different system components. For example, the system may associate one node in a node cluster with one threshold and another node in the same node cluster with a lower threshold, based on a lower processing capacity of the node.

In one or more embodiments, detecting an anomaly in a forecast of future metric values includes applying one set of time-series data to one time-series model of a first type and another set of time-series data to another time-series model of a second type. For example, the system may determine that an ARIMA-type model with a particular configuration of parameters is the most accurate model for predicting metrics of one computing resource in a monitored system. The system may determine that a TBATS-type model is the most accurate model for predicting metrics of another computing resource in the monitored system. The system may detect an anomaly in the forecasted metrics data based on comparing both forecasted values from the ARIMA-type model with one threshold and forecasted values from the TBATS-type model with another threshold. The system may detect an anomaly in the forecasted metrics based on determining that one or both of the forecasted metrics exceed their respective thresholds. Alternatively, the system may detect an anomaly only if both forecasted metrics exceed their respective thresholds.

Based on generating the indication of a predicted anomaly in the monitored system, the system may further recommend or initiate a remediation action (Operation 612). For example, the system may recommend reconfiguring a node cluster, such as by adding, removing, or upgrading nodes based on predicted utilization rates of the nodes in the node cluster exceeding threshold rates. The system may recommend rebalancing assigned tasks to processing components based on detecting one processor from among a set of parallel processors sitting idle or falling below a threshold utilization rate while another processor exceeds the threshold. In this manner, an entity that uses or maintains a computing system may obtain a forecast of a future state of the computing system and initiate actions to remediate predicted anomalies in the computing system.

6. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 7A-7D illustrate an example embodiment of a system 700 performing multi-layer workload forecasting of a monitored computing system 710. The monitored computing system 710 includes a node cluster including node 712 and node 713. Node 713 is a leader node in the cluster, which receives incoming requests and instructions and distributes tasks to a designated node 712 or 713. The nodes 712 and 713 both access a shared database 711 resource. Node 712 hosts a virtual machine 716 with which a client device 720 runs one or more applications. The virtual machine 716 is associated with a workload 718 defined by the tasks required to operate the virtual machine 716. The node 712 is associated with a workload 714 defined by the tasks required to perform the operations on the node 712. The node workload 714 includes the virtual machine workload 718, as well as any other tasks required to perform backend operations, run applications not accessible by the virtual machine 716, run an operating system not accessible by the virtual machine 716, and/or run virtual machines or applications in partitions of the node 712 which are not accessible by the virtual machine 716. Node 713 hosts a virtual machine 717. The virtual machine 717 is associated with a workload 719. The node 713 is associated with a workload 715. The node workload 715 includes the virtual machine workload 719, as well as any other tasks required to perform backend operations, run applications not accessible by the virtual machine 717, run an operating system not accessible by the virtual machine 717, and/or run virtual machines or applications in partitions of the node 713 which are not accessible by the virtual machine 717.

A resource management system 730 monitors operations of the computing system 710 and generates workload forecasts associated with the computing system 710. In particular, the resource management system 730 generates workload forecasts based on time-series models at a particular level of granularity. A low level of granularity may include forecasting workloads for virtual machines. A higher level of granularity may include forecasting workloads for the underlying nodes running the virtual machines. A still higher level of granularity includes forecasting workloads for sibling nodes in node clusters with a target node hosting a target virtual machine.

Figure 7A:
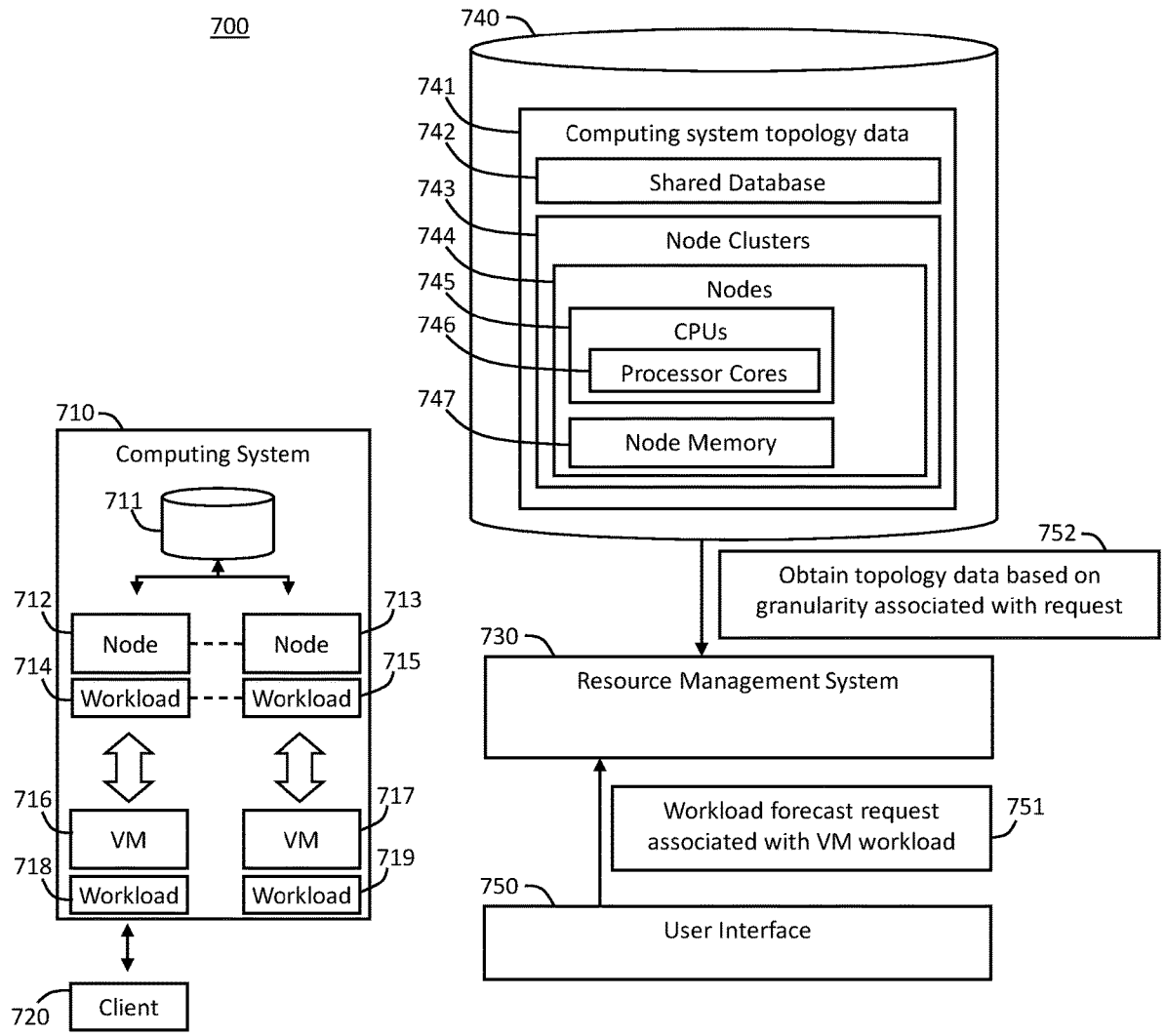
FIGS. 7A-7E illustrate an example embodiment of multi-layer forecasting in a node cluster environment.

Referring to FIG. 7A, the resource management system 730 receives a request 751 via a user interface 750 to initiate a workload forecast associated with the virtual machine workload 718. The workload forecast is to predict workload values at future times. The resource management system 730 obtains topology data based on a granularity associated with the request 751. In the example embodiment in FIG. 7A, the resource management system 730 is configured to provide forecasts at a user-defined frequency (e.g., weekly, monthly). The request 751 specifies a workload associated with the request, including computing workloads of processors in the nodes 712 and/or 713 associated with the virtual machine 716. The request may additionally specify what metrics, such as central processing unit (CPU) usage, memory, and/or I/O, should be forecasted. The resource management system 730 obtains topology data 741 associated with the computing system 710 from a data repository 740. The topology data 741 includes entity attributes associated with the computing system 710. For example, topology data 741 may identify sibling nodes in a node cluster. The entity attributes include attribute data associated with components of a computing system 710, including: shared database data 742, node cluster data 743, node data 744 of nodes in the node cluster (i.e., nodes 712 and 713), CPU data 745 for each node, processor core data 746 for each CPU, and node memory data 747 for each node. The node data 744 includes processing capacity, memory capacity, processor types, disk and storage configurations, operating system configurations, and memory types for processors and memory devices in each node.

Figure 7B:
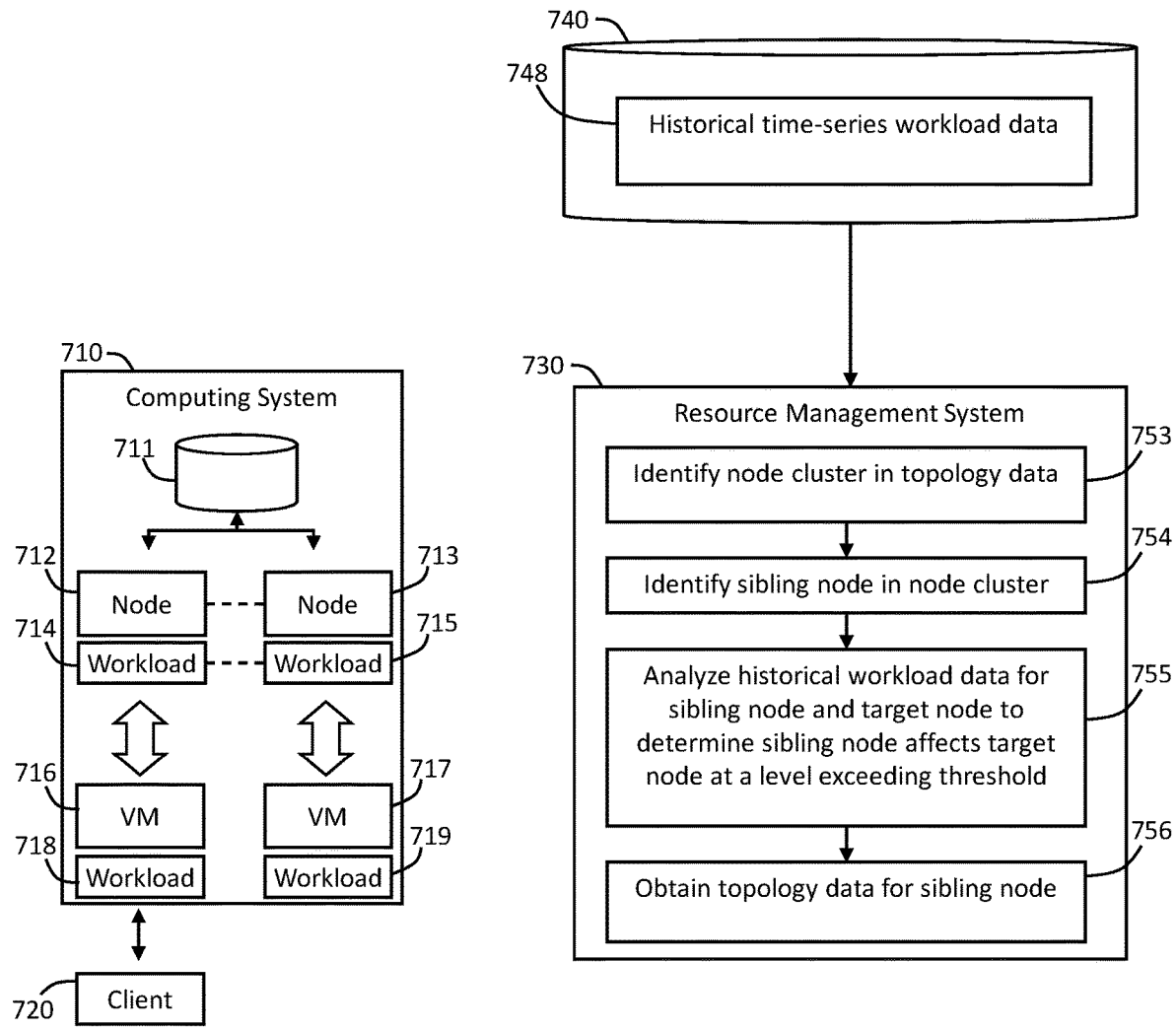

Referring to FIG. 7B, based on the topology data 741, the resource management system 730 identifies 753 the node 712 hosting the target virtual machine 716 associated with the workload forecast request 751. The resource management system 730 identifies attributes of the node 712, including processing attributes, bandwidth attributes, and memory capacity attributes. The resource management system 730 further determines 754 the node 712 is part of a node cluster including node 712 and node 713. Based on the level of granularity associated with the request 751, the resource management system 730 determines whether to respond to the request 751 with only a workload forecast for the node 712 or with workload forecasts for both nodes 712 and 713. To this end, the resource management system 730 obtains historical workload data 748 for node 712 and node 713 to determine whether operations of node 713 affect operations of node 712 at a level exceeding a threshold level. In particular, the system determines whether, in a set of time-series data associated with a week-long time period of hourly time intervals, a correlation exists between an operation of the node 713 and a reduced performance of the node 712 exceeding 10%. For example, if the time-series data indicates the node 712 is utilizing 60% of its processing capacity in one time interval, a subsequent time interval shows a spike in the processing capacity of node 713, and a subsequent time interval shows an increase in the processing capacity utilization of node 712 to 70%, the resource management system 730 may determine that the node 713 affects the node 712 at a level exceeding the threshold level.

Based on determining a workload of the sibling node affects a workload of the target node beyond the threshold level, the resource management system 730 obtains the entity attributes associated with the sibling node. In particular, based on the initial request, the resource management system 730 obtains entity attributes, such as processor and memory data, associated with the node 712 hosting the virtual machine 716. Based on determining the workload of the node 713 affects the workload of the node 712 at a level exceeding a threshold, the resource management system 730 obtains the entity attributes for the sibling node 713.

Figure 7C:
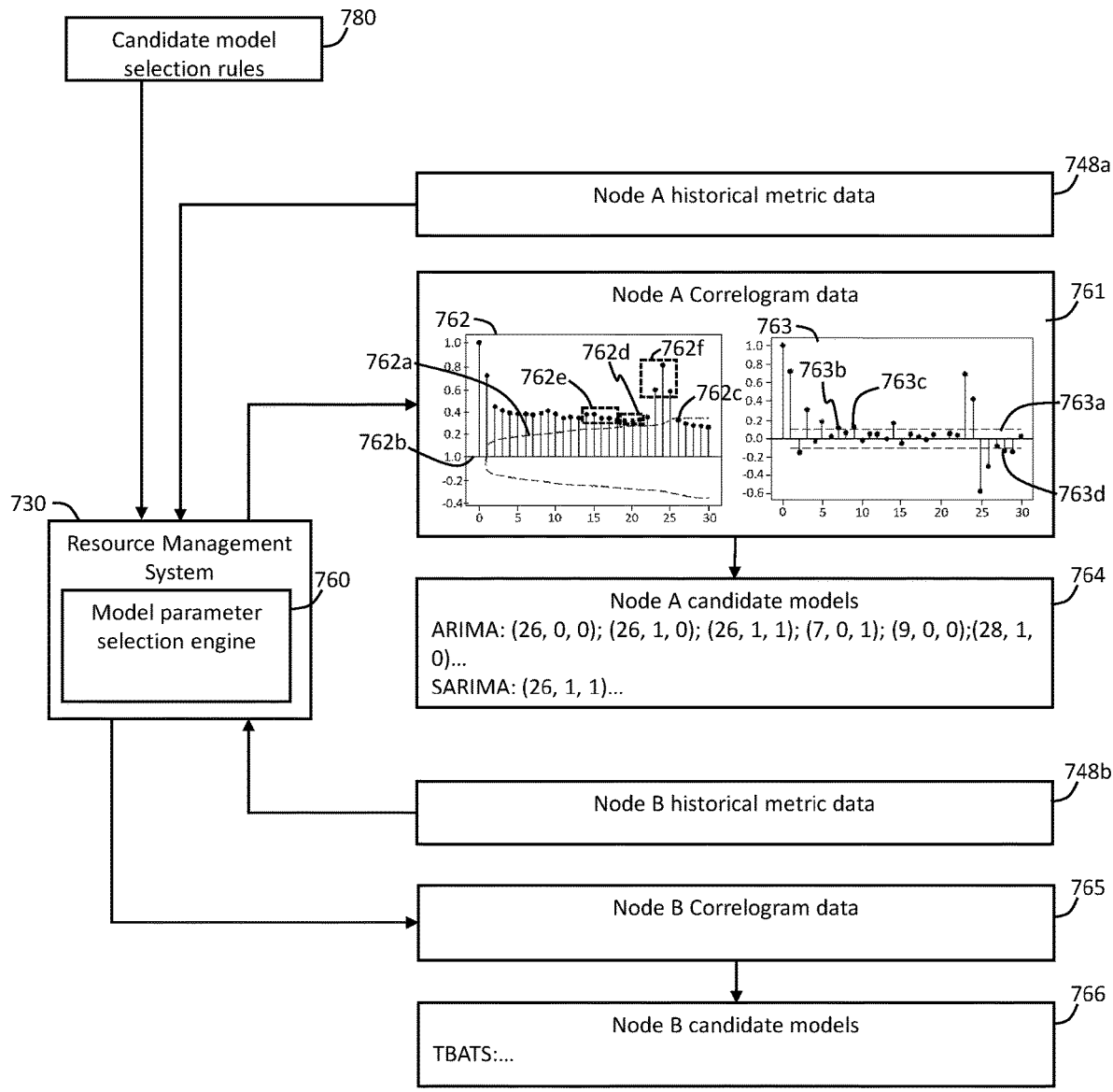

Referring to FIG. 7C, the resource management system 730 obtains, from among the set of historical time-series workload data 748, a set of historical time-series metric data 748a associated with node 712 (e.g., "Node A") and a set of historical time-series metric data 748b associated with node 713 (e.g., "Node B"). The model parameter selection engine 760 generates correlogram data 761 from the historical time-series metric data 748a. The correlogram data 761 includes autocorrelation function (ACF) data 762 and partial autocorrelation function (PACF) data 763. The ACF data 762 and PACF data 763 are shown as graphs in FIG. 7C. However, in one or more embodiments, the ACF data 762 and PACF data 763 are stored and analyzed as digital data, without being displayed as graphs on a user interface. For example, the resource management system 130 generates ACF data 762, compares values in the ACF data 762 to threshold values, and selects model parameters without displaying an ACF graph and without displaying a PACF graph, and further, without user intervention.

The model parameter selection engine 760 analyzes the correlogram data 761 to select parameters for a set of candidate models 764 for forecasting node A metrics. The model parameter selection engine 760 may first select one or more candidate model types based on identified characteristics in one or both of the time-series data 748a and the correlogram data 761. For example, the model parameter selection engine 760 may select an ARIMA-type model for forecasting time-series data based on detecting characteristics of stationarity and non-seasonality in the time-series data. The model parameter selection engine 760 may select a SARIMA-type model for forecasting time-series data based on detecting characteristics of stationarity and seasonality in the time-series data. The model parameter selection engine 760 may select a TBATS-type model for forecasting time-series data based on detecting characteristics of multi-seasonality in the time-series data. The model parameter selection engine 760 may select a SARIMAX-type model for forecasting time-series data based on detecting characteristics of seasonality and the presence of shocks or spikes in the time-series data.

The model parameter selection engine 760 may select multiple different model types as candidate model types for the same set of time-series data. For example, the model may select a SARIMAX-type model and a SARIMA model as candidate model types, based on determining that the time-series data may be ambiguous regarding whether one or more peaks correspond to a shock or outlier, or whether it is part of a seasonal pattern.

The resource management system 730 determines whether the time series data is stationary. For example, the resource management system 730 may divide the historical metric data 748a into two or more sections and calculate the mean and variance for each section. If the mean and variance are within a threshold, the data is stationary. In addition, or in the alternative, the resource management system 730 may perform another function, such as the Dickey-Fuller test, on the time-series to determine whether it is stationary. Based on determining the data is not stationary, the resource management system 730 performs one or more differencing functions on the time-series data 748a until the resource management system 730 determines the data is stationary. The model parameter selection engine 760 stores a number of applications of the differencing function to the time-series data as a parameter for a time-series model.

The resource management system 730 applies the auto-correlation functions to the historical metric data 748a to generate the correlogram data 761. The model parameter selection engine 760 selects additional parameters for the time-series forecasting models based on the correlogram data 761. The ACF diagram data 762 includes a threshold value 762a. The threshold value 762a corresponds to a 95% confidence interval, indicating a particular significance threshold. In correlogram data 761, the values between the threshold value 762a and the base 762b are statistically close to zero. Values exceeding the threshold value 762a are statistically non-zero.

For example, referring to the ACF diagram data 762, the model parameter selection engine 760 identifies a correlation value 762c as intersecting a threshold value 762a. Based on the value 762c being equal to the threshold value 762a, the model parameter selection engine 760 selects the corresponding value 26 as a parameter value for a candidate time-series model. The model parameter selection engine 760 may also identify a set of correlation values 762d that are (a) above the threshold value 762a and (b) meet a distance criteria associated with the threshold value 762a. For example, the criterion may specify that a correlation value must be within a threshold distance, such as a distance of 0.1, from the threshold value 762a. In addition, or in the alternative, the criterion may specify that a correlation value must be closer to the threshold value 762a than other correlation values. For example, the model parameter selection engine 760 may be configured to select model parameters corresponding to the four correlation values in the ACF diagram data 762 that are (a) equal-to or greater-than the threshold value 762a, and (b) are closer to the threshold value 762a than any other correlation values. Accordingly, the model parameter selection engine 760 selects parameter values associated with a set of correlation values 762d for training time-series machine learning models. The system does not select parameter values associated with sets of correlation values 762e and 762f, which are farther from the threshold value 762a than the set of correlation values 762d.

Similarly, the PACF diagram data 763 includes a threshold 763a. The model parameter selection engine 760 selects parameter values for training a time-series machine learning model values corresponding to correlation values that are (a) equal-to or greater-than the threshold value 763a, and (b) are closer to the threshold value 763a than any other correlation values. Based on these criteria, the model parameter selection engine 760 selects parameter values associated with correlation values 763b, 763c, and 763d for training a time-series machine learning model. The model parameter selection engine 760 does not select any of the remaining parameters for training a time-series machine learning model.

In the example embodiment illustrated in FIGS. 7A-7E, the resource management system 730 selects a set of candidate models for training by applying a set of rules 780. The set of rules specifies how many models to be trained, such as eight models in total, from among thousands of possible models with different combinations of parameter values. The resource management system 730 filters down the number of candidate models to the specified number by selecting four parameter values out of thirty potential parameter values (where the parameter value 0 is excluded from consideration) for a particular parameter type. In the example illustrated in FIG. 7C, the model parameter selection engine 760 selects the parameter values 26, 7, 9, and 28, corresponding to correlation values 762c, 763b, 763c, and 763d in the correlogram data, as a "p"-type parameter value for a set of candidate ARIMA models and a "P" parameter for SARIMA models 764. The parameter selection engine 760 further selects additional parameters, such as a "d"-type parameter and a "q"-type parameter of the ARIMA models (having parameter types p, d, and q) based on the correlogram data. For example, the parameter selection engine 760 selects one candidate value for a parameter "d" by determining a number of differencing functions were performed before the resource management system 730 determined the historical time-series metric data had a stationary characteristic. If the parameter selection engine 760 selects a SARIMA-type model, the resource management system 730 updates values for parameters "D" and "Q." The model parameter selection engine 760 may further generate a parameter for an additional candidate model by varying the "d" value, corresponding to a number of performed differencing operations, by one. For example, if two differencing operations were performed prior to determining the data was stationary, the model parameter selection engine 760 may select "2" as one parameter "d" for one version of a candidate time-series model. The model parameter selection engine 760 may select "1" and/or "3" as parameter values for the parameter "d" for additional candidate time-series models. The model parameter selection engine 760 modifies a parameter "D" if the time-series model selection engine 771 selects a SARIMA-type model, based on detecting a seasonality attribute in the time-series data.

The resource management system 730 selects an ARIMA-type model and a SARIMA-type model as candidate model types to forecast time-series metric data for the node 712 (Node A). The resource management system 730 selects a TBATS-type model as a candidate model type to forecast time-series metric data for the node 713 (Node B). The model parameter selection engine 760 generates correlogram data 763 based on the historical time-series metric data 748b associated with node 713 (Node B). The model parameter selection engine 760 selects parameter values for candidate TBATS-type time-series models 764 based on the correlogram data 763.

Figure 7D:
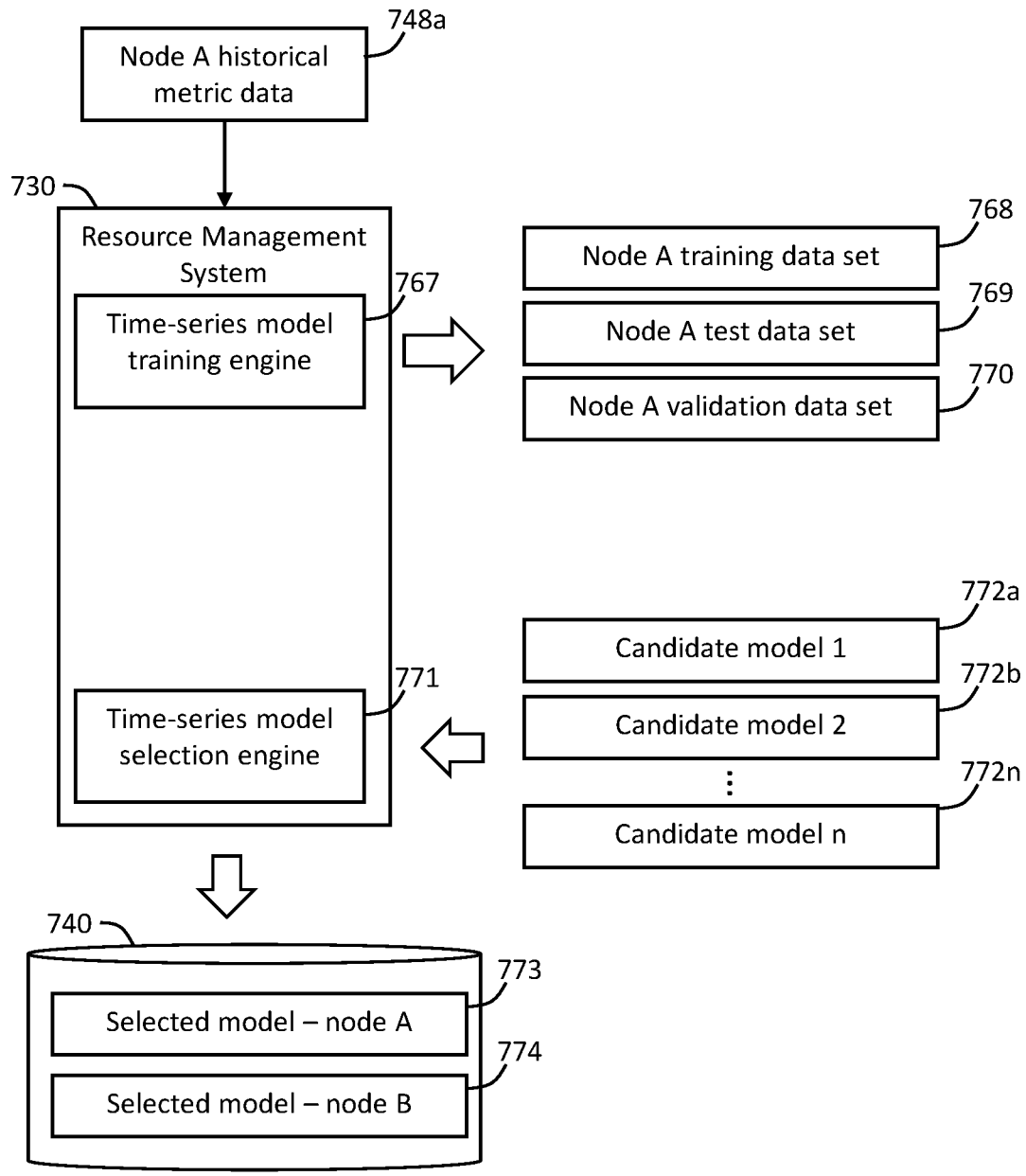

Referring to FIG. 7D, the time-series model training engine 767 divides the historical time-series metric data 748a for node 712 (Node A) into a training data set 768, a test data set 769, and a validation data set 770. The time-series model training engine 767 trains the set of candidate time-series models 764 to generate trained candidate models 772a, 772b, . . . 772n. The time-series model selection engine 771 selects one of the trained candidate models 772a-772n based on the accuracy of the model in forecasting time-series metric data associated with node 712 (Node A). The time-series model selection engine 771 stores the selected model 773 in the data repository 740. The time-series model selection engine 771 also selects a trained time-series model 774 to forecast metric data associated with node 713 (Node B) and stores the model 774 in the data repository 740. The resource management system 730 uses the models 773 and 774 to generate forecasts associated with the respective nodes 712 and 713 until a specified staleness criteria is met. Upon detecting the specified staleness criteria is met (such as a week passing since the model was trained), the resource management system 730 repeats the process of: (a) obtaining historical time-series data for a node, including data from the time period since a model associated with the node was last trained, (b) selecting parameters of a set of candidate models for the node, (c) training the candidate models, and (d) selecting and storing a candidate model to forecast metrics for the node based on a performance of the candidate model compared to other candidate models.

The resource management system 730 obtains current time-series workload data associated with the nodes 712 and 713. The resource management system 730 may monitor operations of the computing system 710 to obtain the current time-series workload data. Alternatively, the resource management system 730 may obtain the most recently-generated time-series workload data associated with the nodes 712 and 713 from the data repository 740. The resource management system 730 applies the ARIMA-type time-series workload forecasting model 773 to the time-series workload data associated with node 712. The resource management system 730 applies the TBATS-type time-series workload forecasting model 774 to the time-series workload data associated with node 713.

Figure 7E:
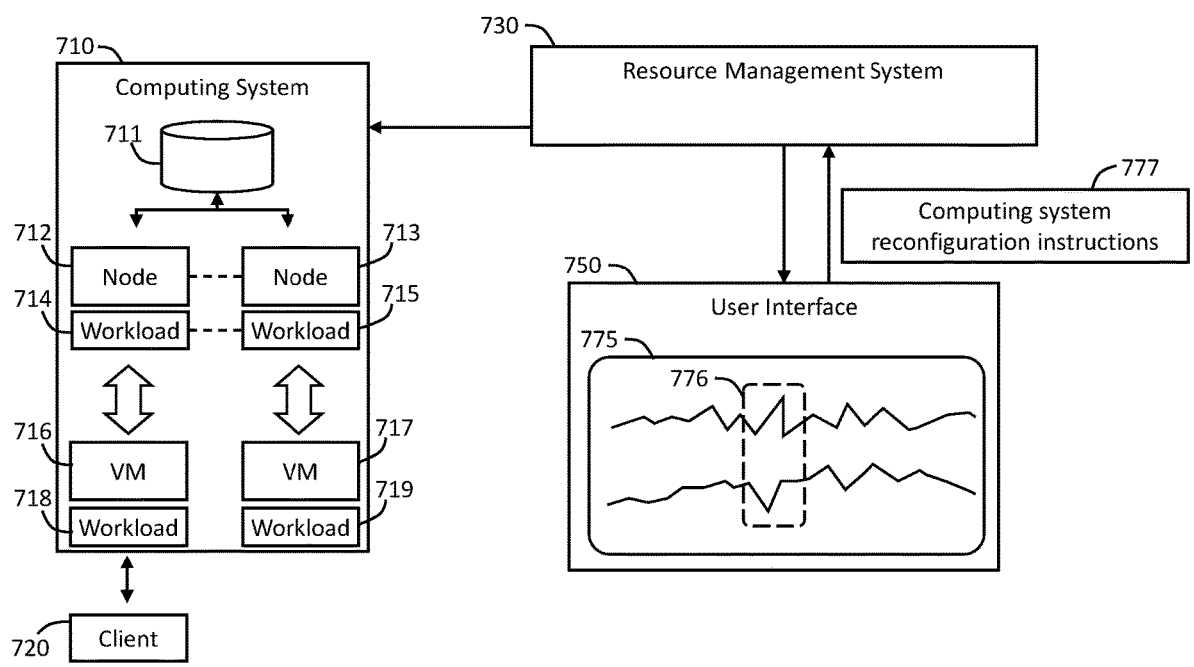

Referring to FIG. 7E, the resource management system 730 presents the forecasts on a graph 775 on the user interface 750. The graph 775 includes a visual indicator 776 of a portion of the predicted time-series workload data in which a workload for one or both of the nodes 712 and 713 will exceed a threshold. The system specifies the threshold as corresponding to an anomaly, such as a metric measuring processing capacity that exceeds a threshold processing capacity. According to one example embodiment, the graph 775 includes workload data for both the node 712 and the virtual machine 716. In particular, since the request 751 was directed to a forecast for the workload 718 associated with the virtual machine 716, the graph includes the forecast for the workload 718 associated with the virtual machine 716. However, since the workload for the virtual machine 716 is affected by the node workload 714 and the node workload 715, the resource management system 730 presents additional forecasts associated with the workloads 714 and 715 to provide a user with information required to modify or reconfigure features of the computing system 710.

Based on the data indicated in the graph 775, an operator interacts with the user interface 750 to generate instructions 777 for reconfiguring the computing system 710. For example, the instructions 777 may include instructions to add one or more additional nodes to the node cluster, to redirect particular requests from a particular client to a different node in the node cluster, or to schedule replacement of a node type of a node in the node cluster to another node type with improved node attributes.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. These configurations may be required to satisfy Service Level Agreements (SLA's) or Service Level Objectives (SLO's) to suit the business functions of an organization or computer system. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or data set, stored by the computer network, is tagged with a tenant ID. A tenant is permitted access to a particular application, data structure, and/or data set only if the tenant and the particular application, data structure, and/or data set are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
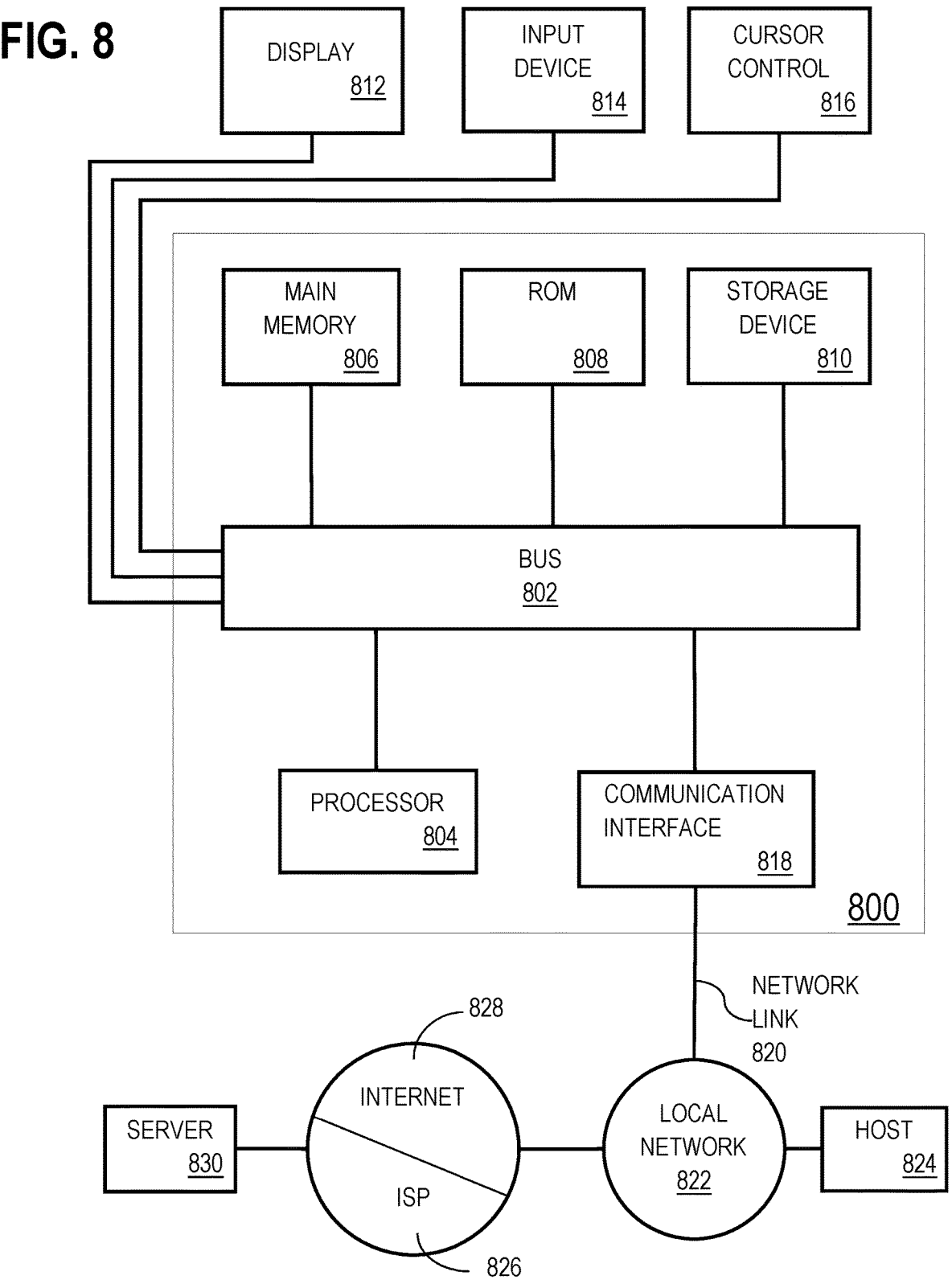
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    inputting a first set of time-series data to a first time-series model, of a plurality of time-series models, to generate a first set of predicted values for a first set of metrics, the first time-series model being based on a first combination of parameters, wherein the first set of time-series data is obtained by monitoring operations of one or more nodes in a computing system, wherein the one or more nodes comprise one or more processors for processing tasks in the computing system;
    determining a first performance of the first time-series model based at least on an accuracy of the first set of predicted values;
    inputting the first set of time-series data to a second time-series model, of the plurality of time-series models, to generate a second set of predicted values for the first set of metrics, the second time-series model being based on a second combination of parameters that is different than the first combination of parameters;
    determining a second performance of the second time-series model based at least on an accuracy of the second set of predicted values;
    selecting the first time-series model, from the plurality of time-series models, for anomaly detection based at least on the first performance of the first time-series model and the second performance of the second time-series model;
    inputting a second set of time-series data collected from a monitored system to the first time-series model to generate a third set of predicted values for the first set of metrics;
    comparing the third set of predicted values for the first set of metrics to a first threshold value associated with the first set of metrics to determine that a first predicted anomaly exists in the monitored system; and
    outputting a prediction that the first predicted anomaly exists in the monitored system; and
    based on the prediction, initiating remedial action in the monitored system,
    wherein initiating the remedial action comprises at least one of:
        reconfiguring the one or more nodes in the computing system;
        rebalancing one or more assigned tasks among the one or more nodes in the computing system;
        adding one or more nodes to the computing system;
        removing one or more nodes from the computing system;
        redirecting requests from a first node to a second node, among the one or more nodes in the computing system; and
        scheduling a replacement of a set of nodes of a particular node type, from among the one or more nodes in the computing system.

2. The non-transitory computer readable medium of claim 1, wherein the operations further comprise training the first time-series model and the second time-series model using historical time-series data corresponding to the first set of metrics.

3. The non-transitory computer readable medium of claim 1, wherein the first set of metrics are associated with a first workload in the monitored system.

4. The non-transitory computer readable medium of claim 3, wherein the first workload is associated with one of:
    a set of physical hardware, including processors, facilitating data communications with computational resources;
    a virtual machine;
    a node of a node hosting a virtual machine;
    a database accessed by one or more nodes of a node cluster;
    a database server accessing the database;
    an application run by one or more nodes of the node cluster; and
    an application server executing one or more applications accessed by one or more nodes of the node cluster.

5. The non-transitory computer readable medium of claim 3, wherein the operations further comprise:
    receiving a request to generate a prediction of anomalies in a particular workload of the monitored system;
    identifying the first workload as being associated with the request;
    generating the third set of predicted values for the first set of metrics responsive to identifying the first workload as being associated with the request;

responsive to identifying a second workload as being related to the first workload: generating a fourth set of predicted values for a second metrics associated with the second workload; and outputting a second indication that a second predicted anomaly exists in the monitored system based on determining that at least one of:

the third set of predicted values for the first set of metrics exceeds the first threshold value; and the fourth set of predicted values for the second metrics exceeds a second threshold value.

6. The non-transitory computer readable medium of claim 5, wherein the operations further comprise:

outputting the second indication that the second predicted anomaly exists in the monitored system based on determining:

the third set of predicted values for the first set of metrics does not exceed the first threshold value; and the fourth set of predicted values for the second metrics exceeds the second threshold value.

7. The non-transitory computer readable medium of claim 3, wherein the first time-series model includes an exogenous variable, wherein the first set of time-series data collected from the monitored system includes a first set of values within a threshold operating range, wherein the first set of time-series data collected from the monitored system includes at least one value outside the threshold operating range, wherein the exogenous variable in the first time-series model reduces a variance of values in the third set of predicted values for the first set of metrics resulting from an influence of the at least one value outside the threshold operating range.

8. The non-transitory computer readable medium of claim 1, wherein the operations further comprise:

responsive to outputting the prediction that the first predicted anomaly exists in the monitored system: generating a recommendation for modifying a distribution of computing resources in the monitored system.

9. A method comprising:

inputting a first set of time-series data to a first time-series model, of a plurality of time-series models, to generate a first set of predicted values for a first set of metrics, the first time-series model being based on a first combination of parameters, wherein the first set of time-series data is obtained by monitoring operations of one or more nodes in a computing system, wherein the one or more nodes comprise one or more processors for processing tasks in the computing system;

determining a first performance of the first time-series model based at least on an accuracy of the first set of predicted values;

inputting the first set of time-series data to a second time-series model, of the plurality of time-series models, to generate a second set of predicted values for the first set of metrics, the second time-series model being based on a second combination of parameters that is different than the first combination of parameters;

determining a second performance of the second time-series model based at least on an accuracy of the second set of predicted values;

selecting the first time-series model, from the plurality of time-series models, for anomaly detection based at least on the first performance of the first time-series model and the second performance of the second time-series model;

inputting a second set of time-series data collected from a monitored system to the first time-series model to generate a third set of predicted values for the first set of metrics;

comparing the third set of predicted values for the first set of metrics to a first threshold value associated with the first set of metrics to determine that a first predicted anomaly exists in the monitored system; and outputting a prediction that the first predicted anomaly exists in the monitored system; and based on the prediction, initiating remedial action in the monitored system, wherein initiating the remedial action comprises at least one of:

reconfiguring the one or more nodes in the computing system;

rebalancing one or more assigned tasks among the one or more nodes in the computing system;

adding one or more nodes to the computing system;

removing one or more nodes from the computing system;

redirecting requests from a first node to a second node, among the one or more nodes in the computing system; and scheduling a replacement of a set of nodes of a particular node type, from among the one or more nodes in the computing system.

10. The method of claim 9, further comprising: training the first time-series model and the second time-series model using historical time-series data corresponding to the first set of metrics.

11. The method of claim 9, wherein the first set of metrics are associated with a first workload in the monitored system.

12. The method of claim 11, wherein the first workload is associated with one of:

a set of physical hardware, including processors, facilitating data communications with computational resources;

a virtual machine;

a node of a node hosting a virtual machine;

a database accessed by one or more nodes of a node cluster;

a database server accessing the database;

an application run by one or more nodes of the node cluster; and an application server executing one or more applications accessed by one or more nodes of the node cluster.

13. The method of claim 11, further comprising:

receiving a request to generate a prediction of anomalies in a particular workload of the monitored system;

identifying the first workload as being associated with the request;

generating the third set of predicted values for the first set of metrics responsive to identifying the first workload as being associated with the request;

responsive to identifying a second workload as being related to the first workload: generating a fourth set of predicted values for a second metrics associated with the second workload; and outputting a second indication that a second predicted anomaly exists in the monitored system based on determining that at least one of:

the third set of predicted values for the first set of metrics exceeds the first threshold value; and the fourth set of predicted values for the second metrics exceeds a second threshold value.

14. The method of claim 13, further comprising:

outputting the second indication that the second predicted anomaly exists in the monitored system based on determining:
the third set of predicted values for the first set of metrics does not exceed the first threshold value; and
the fourth set of predicted values for the second metrics exceeds the second threshold value.

15. The method of claim 11, wherein the first time-series model includes an exogenous variable,
wherein the first set of time-series data collected from the monitored system includes a first set of values within a threshold operating range,
wherein the first set of time-series data collected from the monitored system includes at least one value outside the threshold operating range,
wherein the exogenous variable in the first time-series model reduces a variance of values in the third set of predicted values for the first set of metrics resulting from an influence of the at least one value outside the threshold operating range.

16. The method of claim 9, further comprising:
responsive to outputting the prediction that the first predicted anomaly exists in the monitored system: generating a recommendation for modifying a distribution of computing resources in the monitored system.

17. A system comprising:
one or more processors; and
memory storing instructions that, when executed by the one or more processors, cause the system to perform operations comprising:
inputting a first set of time-series data to a first time-series model, of a plurality of time-series models, to generate a first set of predicted values for a first set of metrics, the first time-series model being based on a first combination of parameters, wherein the first set of time-series data is obtained by monitoring operations of one or more nodes in a computing system, wherein the one or more nodes comprise one or more processors for processing tasks in the computing system;
determining a first performance of the first time-series model based at least on an accuracy of the first set of predicted values;
inputting the first set of time-series data to a second time-series model, of the plurality of time-series models, to generate a second set of predicted values for the first set of metrics, the second time-series model being based on a second combination of parameters that is different than the first combination of parameters;
determining a second performance of the second time-series model based at least on an accuracy of the second set of predicted values;
selecting the first time-series model, from the plurality of time-series models, for anomaly detection based at least on the first performance of the first time-series model and the second performance of the second time-series model;
inputting a second set of time-series data collected from a monitored system to the first time-series model to generate a third set of predicted values for the first set of metrics;
comparing the third set of predicted values for the first set of metrics to a first threshold value associated with the first set of metrics to determine that a first predicted anomaly exists in the monitored system; and
outputting a prediction that the first predicted anomaly exists in the monitored system; and
based on the prediction, initiating remedial action in the monitored system,
wherein initiating the remedial action comprises at least one of:
reconfiguring the one or more nodes in the computing system;
rebalancing one or more assigned tasks among the one or more nodes in the computing system;
adding one or more nodes to the computing system;
removing one or more nodes from the computing system;
redirecting requests from a first node to a second node, among the one or more nodes in the computing system; and
scheduling a replacement of a set of nodes of a particular node type, from among the one or more nodes in the computing system.

18. The system of claim 17, wherein the operations further comprise training the first time-series model and the second time-series model using historical time-series data corresponding to the first set of metrics.

* * * * *